United States Patent
Kang et al.

(10) Patent No.: US 10,681,345 B2
(45) Date of Patent: Jun. 9, 2020

(54) IMAGE PROCESSING APPARATUS, IMAGE PROCESSING METHOD, AND IMAGE DISPLAY SYSTEM

(71) Applicant: SAMSUNG ELECTRONICS CO., LTD., Suwon-si (KR)

(72) Inventors: Woo Seok Kang, Suwon-si (KR); Min Yong Sung, Suwon-si (KR); Ki Won Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/058,042

(22) Filed: Aug. 8, 2018

(65) Prior Publication Data

US 2019/0052873 A1    Feb. 14, 2019

(30) Foreign Application Priority Data

Aug. 8, 2017    (KR) .................. 10-2017-0100373

(51) Int. Cl.
| | |
|---|---|
| *H04N 19/103* | (2014.01) |
| *H04N 19/166* | (2014.01) |
| *H04N 19/136* | (2014.01) |
| *H04N 19/172* | (2014.01) |
| *A63F 13/35* | (2014.01) |
| *H04N 19/162* | (2014.01) |

(52) U.S. Cl.
CPC ......... *H04N 19/103* (2014.11); *H04N 19/136* (2014.11); *H04N 19/166* (2014.11); *H04N 19/172* (2014.11); *A63F 13/35* (2014.09); *H04N 19/162* (2014.11)

(58) Field of Classification Search
None
See application file for complete search history.

(56) References Cited

U.S. PATENT DOCUMENTS

| | | | |
|---|---|---|---|
| 9,043,523 | B2 | 5/2015 | Sandra et al. |
| 9,681,183 | B1 | 6/2017 | Majid |
| 2013/0263201 | A1 | 10/2013 | Chung-How et al. |
| 2014/0187331 | A1 | 7/2014 | Kim et al. |
| 2014/0198839 | A1 | 7/2014 | Potdar et al. |
| 2014/0269907 | A1 | 9/2014 | Joset et al. |
| 2016/0029020 | A1 | 1/2016 | Eymery et al. |
| 2016/0234535 | A1 | 8/2016 | Todd |
| 2016/0261900 | A1* | 9/2016 | Verma .................. H04N 21/266 |
| 2017/0094316 | A1 | 3/2017 | Sullivan |

OTHER PUBLICATIONS

Written Opinion (PCT/ISA/237) issued by the International Searching Authority in corresponding International Application No. PCT/KR2018/008430, dated Oct. 31, 2018.

* cited by examiner

*Primary Examiner* — Christopher G Findley
(74) *Attorney, Agent, or Firm* — Sughrue Mion, PLLC

(57)    ABSTRACT

An image processing apparatus includes a content interface, a communication interface and a controller configured to receive content from a content source through the content interface, encode image frames comprised in the content according to an encoding mode, and transmit the encoded image frames to a display apparatus through the communication interface. The controller encodes the image frames according to a first encoding option in a first encoding mode and encodes the image frames according to a second encoding option having a different encoding time delay from that of the first encoding option in a second encoding mode.

20 Claims, 14 Drawing Sheets

IMAGE PROCESSING APPARATUS, IMAGE PROCESSING METHOD, AND IMAGE DISPLAY SYSTEM

CROSS-REFERENCE TO RELATED APPLICATION

This application is based on and claims priority under 35 U.S.C. § 119 to Korean Patent Application No. 10-2017-0100373, filed on Aug. 8, 2017 in the Korean Intellectual Property Office, the disclosure of which is incorporated by reference herein in its entirety.

BACKGROUND

1. Field

The disclosure broadly relates to an image display system, and more particularly, to an image display system including an image processing apparatus and a display apparatus.

2. Description of Related Art

In general, image display apparatuses include a display panel and display various formats of image data.

Particularly, an image display apparatus may receive content data from various content sources such as broadcasting stations, Internet servers, image reproducing devices, gaming devices, and/or portable terminals. Also, the image display apparatus may restore (decode) image frames from the content data and display the restored image frames on the display panel.

With the recent increase in types of content sources, the number of the content sources connected to an image display apparatus has been increased.

As a result, the number of cables connecting the image display apparatus with each of the content sources has also been increased. The increase in the number of cables mars or degrades the appearance of the image display apparatus and the users have difficulty in arrangement of the cables.

The above information is presented as background information only to assist with an understanding of the present disclosure. No determination has been made, and no assertion is made, as to whether any of the above might be applicable as prior art with regard to the present disclosure.

SUMMARY

Therefore, in accordance with an aspect of the present disclosure, an image display system is provided, which separately includes an image processing apparatus configured to receive content data and a display apparatus configured to display an image corresponding to the content data.

In accordance with another aspect of the present disclosure, an image display system is provided, which includes an image processing apparatus and a display apparatus connected to each other in a wireless manner.

In accordance with yet another aspect of the present disclosure, an image display system is provided, which controls a time delay according to user input, a content source, and/or type of content.

Additional aspects of the disclosure will be set forth in part in the description which follows and, in part, will be obvious from the description, or may be learned by practice of the disclosure.

In accordance with one aspect of the present disclosure, an image processing apparatus includes a content interface, a communication interface and a controller configured to receive content from a content source through the content interface, encode image frames of the content according to an encoding mode, and transmit the encoded image frames to a display apparatus through the communication interface. The controller encodes the image frames according to a first encoding option in a first encoding mode and encodes the image frames according to a second encoding option having a different encoding time delay from that of the first encoding option in a second encoding mode.

The controller may encode the image frames according to the first encoding option having a first encoding time delay and a first loss rate of image information in the first encoding mode. The controller may encode the image frames according to the second encoding option having a second encoding time delay greater than the first encoding time delay and a second loss rate of image information smaller than the first loss rate of image information.

The controller includes an event generator configured to output a first event signal when at least one of the content includes metadata indicating the first encoding option or reception of user input is initiated and to output a second event signal when at least one of the content includes metadata indicating the second encoding option or reception of the user input is terminated, and an image encoder configured to encode the image frames according to the first encoding option or the second encoding option in response to the first event signal or the second event signal.

In response to receiving the first event signal, the encoding mode of the image encoder may be changed to the first encoding mode and the image encoder may encode the image frames with the first encoding time delay and the first loss rate of image information.

When the encoded image frames are duplicates while the image frames are encoded according to the first encoding option, the image encoder may prevent the duplicated image frames from being output.

In response to receiving the second event signal, the encoding mode of the image encoder may be changed to the second encoding mode and the image encoder may encode the image frames with the second encoding time delay and the second loss rate of image information.

When the encoded image frames are missing while the image frames are encoded according to the second encoding option, the image encoder may add metadata to the encoded image frames allowing the display apparatus to supplement the missing image frames.

The event generator may output at least one of the first event signal or the second event signal according to a changed content source when the content source is changed and output at least one of the first event signal or the second event signal according to a changed content when the content is changed.

The controller transmits, through the communication interface, the encoded image frames to the display apparatus in a wireless manner.

In accordance with one aspect of the present disclosure, a method of processing an image includes receiving content from a content source, encoding image frames comprised in the content according to an encoding mode, generating different event signals according to at least one of metadata comprised in the content or reception of user input, and transmitting encoded image frames to a display apparatus. The encoding of the image frames may include encoding the image frames in encoding options having different encoding time delays in response to the different event signals.

The encoding of the image frames in the encoding options having the different encoding time delays may include encoding the image frames according to a first encoding option having a first encoding time delay and a first loss rate of image information in response to a first event signal, and encoding the image frames according to a second encoding option having a second encoding time delay greater than the first encoding time delay and a second loss rate of image information smaller than the first loss rate of image information in response to a second event signal.

The generating of the event signals comprises generating the first event signal when at least one of the content source is changed, the content is changed, user input is received, or the content includes metadata indicating the first encoding option.

The encoding may further include changing the encoding mode to a first encoding mode in response to the first event signal, and when encoded image frames are duplicates while encoding the image frames in the first encoding mode, preventing the duplicate images frames from being output.

The generating of the event signal comprises outputting the second event signal when at least one of the content source is changed, the content is changed, user input is terminated, and the content includes metadata indicating the second encoding option.

The encoding may further include changing the encoding mode to a second encoding mode in response to the second event signal, and when the encoding image frames are missing while encoding the image frames in the second encoding mode, adding metadata to the encoded image frames allowing the display apparatus to supplement missing image frames.

In accordance with one aspect of the present disclosure, an image display system include an image processing apparatus configured to encode image content to an image data stream, and a display apparatus configured to display image frames converted from the image data stream. The image processing apparatus include a transmitter, and a controller configured to encode the image content according to encoding modes with varying encoding time delays in response to at least one of a change in the image content, a change in a source of the image content, user input, and metadata of the image content, and transmit the image data stream to the display apparatus through the transmitter.

The controller may encode the image content with a first encoding time delay and a first loss rate of image information in a first encoding mode and encodes the image content with a second encoding time delay greater than the first encoding time delay and a second loss rate of image information smaller than the first loss rate of image information in a second encoding mode.

In response to receiving the user input while encoding the image content in the second encoding mode, the controller may change the encoding mode from the second encoding mode to the first encoding mode.

In response to the user input being terminated while encoding the image content in the first encoding mode, the controller may change the encoding mode from the first encoding mode to the second encoding mode.

The display apparatus may receive the image data stream, convert the image data stream into image frames, and display the image frames.

BRIEF DESCRIPTION OF THE DRAWINGS

These and/or other aspects of the disclosure will become apparent and more readily appreciated from the following description of the embodiments, taken in conjunction with the accompanying drawings, in which.

DETAILED DESCRIPTION OF EXEMPLARY EMBODIMENTS

Figure 1:
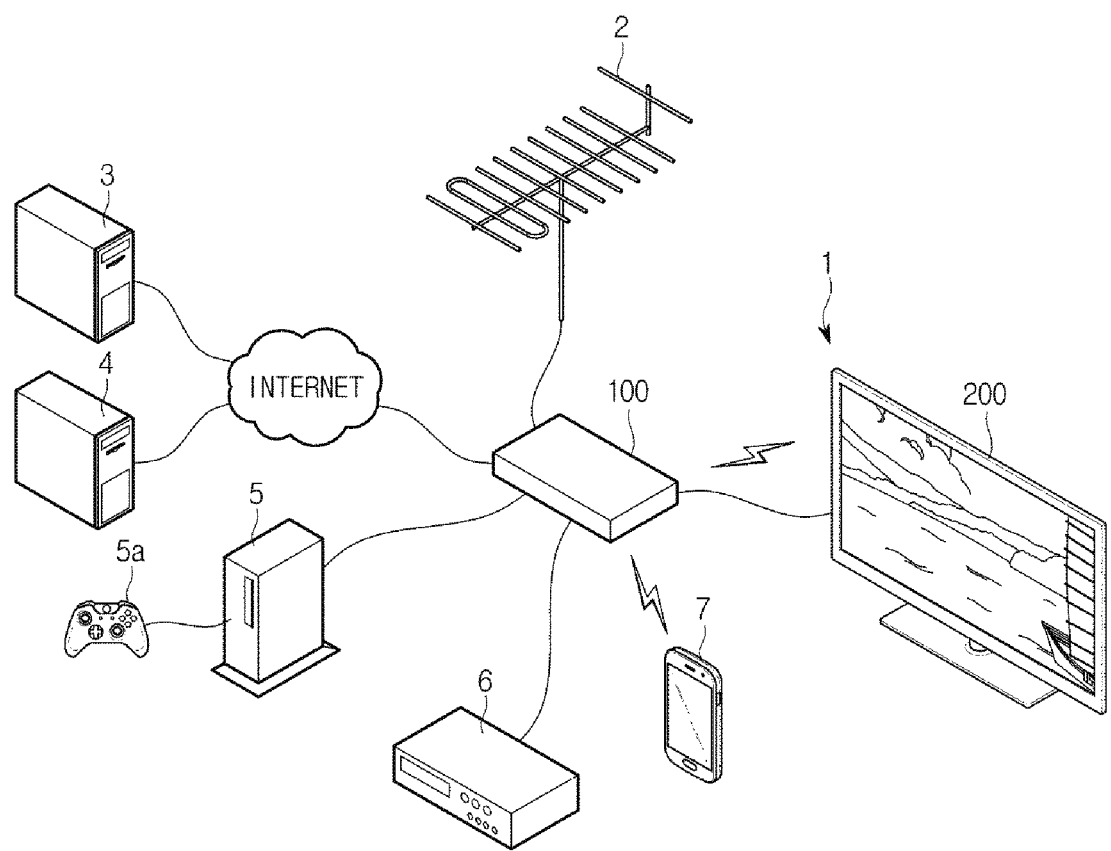
FIG. 1 is a block diagram illustration an image display system and content sources according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to embodiments of the present disclosure, examples of which are illustrated in the accompanying drawings, where like reference numerals refer to like elements throughout.

FIG. 1 is a block diagram illustrating an image display system and content sources according to an embodiment.

As illustrated in FIG. 1, an image display system 1 includes an image processing apparatus 100 configured to generate image data from video content and a display apparatus 200 configured to convert the image data into a visual image and display the visual image. In addition, the image processing apparatus 100 may be connected to the display apparatus 200 in a wired and/or wireless manner.

The image processing apparatus 100 may receive video content from various video content sources 2, 3, 4, 5, 6, and 7.

For example, the image processing apparatus 100 may receive television (TV) broadcast content from a broadcast receiving antenna 2. The TV broadcast content received from a transmission tower may include video content and the broadcast receiving antenna 2 may receive video data wirelessly transmitted from the transmission tower. For wireless communications (terrestrial broadcast transmission/reception), TV broadcast content may be encoded into image data and modulated into radio signals. "Encoding" may include compressing video content to reduce a capacity of the transmitted video content. The "encoding" may be performed by algorithms such as Moving Picture Experts Group (MPEG) and High Efficiency Video Coding (HEVC). "Modulation" may include modifying the amplitude, frequency, phase, and the like of a carrier in accordance with image data to wirelessly transmit a signal. The "modulation" may include, for example, amplitude-shift keying (ASK), frequency-shift keying (FSK), phase-shift keying (PSK), and quadrature amplitude modulation (QAM).

The image processing apparatus 100 may receive the video data received by the broadcast receiving antenna 2.

The image processing apparatus 100 may receive video content from a video service server 3. The video service server 3 may store various types of video content such as movie, drama, and sports and transmit video content data in real time through a wide area network (e.g., the Internet). In other words, the video service server 3 may stream the video content. The image processing apparatus 100 may access the Internet through a network provided by an internet service provider (ISP) and receive video content data from the video service server 3 in real time.

The image processing apparatus 100 may receive game content from a game service server 4. The game service server 4 may provide game content to a user through a wide area network. The game content includes video content and audio content and the game service server 4 may transmit a plurality of images (video content), which changes by user input received via a separate input device, to the image processing apparatus 100. In other words, the game service server 4 may transmit video content data to the image processing apparatus 100 and the image processing apparatus 100 may receive the video content data from the game service server 4 through the Internet.

The image processing apparatus 100 may directly receive game content from a gaming device 5. The gaming device 5 may generate (render) an image in accordance with user input received via an input device 5a of the gaming device 5 and sequentially transmit a plurality of generated images (video content) to the image processing apparatus 100 via a cable for video transmission. In other words, the gaming device 5 may transmit video content data to the image processing apparatus 100 via the cable for video transmission and the image processing apparatus 100 may receive the video content data from the gaming device 5 via the cable for video transmission.

The image processing apparatus 100 may receive video content from an image reproducing device 6 via a cable for video transmission. The image reproducing device 6 may store various types of video content such as movie, drama, and sports or reproduce various types of video content recorded on a recording medium. The image reproducing device 6 may transmit the video content data to the image processing apparatus 100 through the cable for video transmission and the image processing apparatus 100 may receive the video content data from the image reproducing device 6 through the cable for video transmission.

In addition, the image processing apparatus 100 may wirelessly receive video content from a portable terminal 7. The portable terminal 7 may transmit video data to the image processing apparatus 100 using wireless communications standards such as WIFI™ and Bluetooth™. For example, the portable terminal 7 may transmit the same image (mirroring image) as an image displayed on a display of the portable terminal 7 to the image processing apparatus 100 in real time and the image processing apparatus 100 may wirelessly receive the mirroring image from the portable terminal 7.

As described above, the image processing apparatus 100 may receive content data including video data from the various content sources 2 to 7 and may decode a plurality of images (image frames) from the video data or form (render) the plurality of image frames from the video data.

The image processing apparatus 100 may transmit a plurality of image frames to the display apparatus 200. For example, the image processing apparatus 100 may convent the plurality of image frames into an image data stream and transmit the image data stream to the display apparatus 200.

The display apparatus 200 may receive the image data stream from the image processing apparatus 100, restore the image frames from the image data stream, and sequentially display the image frames.

For example, the display apparatus 200 may include various display devices such as a television, a monitor, a display terminal, a portable terminal, a laptop computer, a projector, and a billboard.

In addition, the display apparatus 200 may include various display panels such as a cathode ray tube (CRT) panel, an electro luminescence (EL) panel, an organic light emitting diode (OLED) panel, a vacuum fluorescence display (VFD) panel, a field emission display (FED) panel, a plasma display panel (PDP), and a liquid crystal display (LCD) panel.

The image processing apparatus 100 may be connected to the display apparatus 200 in a wired or wireless manner. In other words, the image processing apparatus 100 may transmit the plurality of image frames to the display apparatus 200 by wire or wirelessly.

For example, when the image processing apparatus 100 is connected to the display apparatus 200 by wire, a relatively wide bandwidth for transmitting image data streams may be provided between the image processing apparatus 100 and the display apparatus 200. Thus, the image processing apparatus 100 may convert a high-quality image into an image data stream and transmit the image data stream to the display apparatus 200 with a high transmission rate.

When the image processing apparatus 100 is wirelessly connected to the display apparatus 200, a bandwidth for transmitting image data streams may be limited. For example, in order to transmit a high-quality image (e.g., image with Ultra High Definition (UHD) or Full High Definition (Full HD), a transmission rate of several hundreds of megabits per second (Mbps) or several gigabits per second (Gbps) may be required. On the contrary, when an image data stream is wirelessly transmitted by using a frequency of 2.4 gigahertz GHz (Giga Hertz), the image processing apparatus 100 may transmit image data streams through three channels having a bandwidth of approximately 22 MHz which may vary according to communications standards. The image processing apparatus 100 may transmit image data streams at a transmission rate of approximately several tens of Mbps.

When the image processing apparatus 100 is connected to the display apparatus 200 in a wireless manner, the image processing apparatus 100 may perform encoding to compress a high-quality image for transmission of the high-quality image. Compressed image frames may be converted into an image data stream. Also, the image processing apparatus 100 may transmit the image data stream to the display apparatus 200.

As described above, by compressing a high-quality image, the capacity (size) of the transmitted image may be reduced and a transmission rate for transmission of the image data stream may be reduced.

In addition, the image processing apparatus 100 may control a compression rate of an image and a delay time for image compression in accordance with types of content sources and/or content.

When the image processing apparatus 100 compresses a high-quality image, image information may be lost due to compression of the image and a time delay for compressing the image may occur. In the case of compressing an image, the loss of image information and the time delay for compressing the image need to be minimized.

When the image processing apparatus 100 transmits an image data stream at a constant transmission rate, the loss of image information caused during image compression and the time delay for image compression may have a certain relationship with each other. For example, as the loss of image information decreases, the time delay for image compression may increase. As the time delay for image compression decreases, the loss of image information may increase. In other words, the loss of image information is in inversely proportional to or has trade off relation with the time delay for image compression.

As a result, when the image processing apparatus 100 transmits a high-quality image to the display apparatus 200 with a less loss of image information, the time delay may increase. In other words, an encoding delay for image compression increases.

In addition, when the image processing apparatus 100 transmits an image to the display apparatus 200 with a shorter time delay, the loss of image information may increase. In other words, a low-quality image may be transmitted to the display apparatus 200.

The image processing apparatus 100 may operate in various loss/delay modes according to the loss rate of image information and the time delay. For example, the image processing apparatus 100 may operate in various loss/delay modes such as a first loss/delay mode having a loss rate of 10% and a time delay of 1 frame, a second loss/delay mode having a loss rate of 20% and a time delay of 2 frames, a third loss/delay mode having a loss rate of 30% and a time delay of 3 frames, a fourth loss/delay mode having a loss rate of 40% and a time delay of 4 frames, and a fifth loss/delay mode having a loss rate of 50% and a time delay of 5 frames. These modes are provided by way of an example and not by way of a limitation.

In addition, as used hereinafter, the term "high-loss/low-delay mode" may refer to a loss/delay mode having a high loss rate of image information and a short time delay for image compression, and the term "low-loss/high-delay mode" may refer to a loss/delay mode having a low loss rate of image information and a long time delay for image compression.

In the high-loss/low-delay mode, the image processing apparatus 100 may compress/encode image frames in sub-frame units to minimize a delay between an image reproducing time of the content sources 2 to 7 and an image displaying time of the display apparatus 200. For example, the image processing apparatus 100 may perform only intra frame encoding using only a current image frame or may perform inter frame encoding using only a past image frame together with intra frame encoding.

In the low-loss/high-delay mode, the image processing apparatus 100 may perform intra frame encoding using a current image frame and inter frame encoding using past and future image frames to transmit a high-quality image to the display apparatus 200. Furthermore, the image processing apparatus 100 may reduce the loss of image information by preprocessing images received from the content sources 2 to 7.

In addition, the image processing apparatus 100 may change the loss/delay mode according to the type of the content source and/or content and/or the user input.

For example, in the case of content not requiring a response to the user input (e.g., movie and drama), the image processing apparatus 100 may operate in the low-loss/high-delay mode allowing the display apparatus 200 to display a high-quality image. When the content sources 2 to 7 is the image reproducing device 6 or the video service server 3, the image processing apparatus 100 may operate in the low-loss/high-delay mode.

In the case of content requiring a quick response to the user input (e.g., game), the image processing apparatus 100 may operate in the high-loss/low-delay mode to quickly response to the user input. When the content sources 2 to 7 is the gaming device 5 or the game service server 4, the image processing apparatus 100 may operate in the high-loss/low-delay mode.

In addition, the image processing apparatus 100 may change the loss/delay mode while displaying an image.

For example, if there is no user input within a predetermined time while an image of game content is displayed, the image processing apparatus 100 may operate in the low-loss/high-delay mode allowing the display apparatus 200 to display a high-quality image. In addition, if there is user input while the image of game content is displayed, the image processing apparatus 100 may change the mode to the high-loss/low-delay mode to quickly respond to the user input.

Hereinafter, the configuration and operation of the image processing apparatus 100 and the display apparatus 200 included in the image display system 1 will be described.

Figure 2:
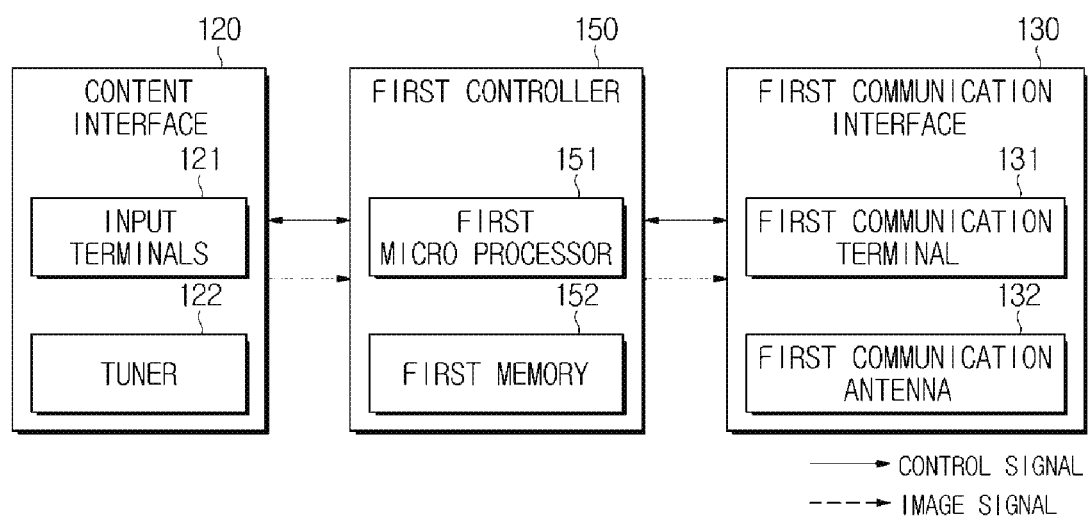
FIG. 2 is a block diagram illustrating a configuration of an image processing apparatus according to an embodiment.
Figure 3:
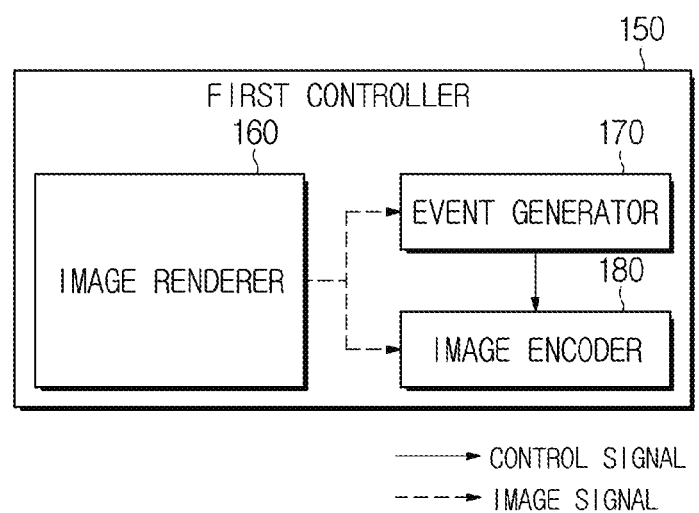
FIG. 3 is a block diagram illustrating a configuration of a first image processor included in the image processing apparatus according to an embodiment.

FIG. 2 is a block diagram illustrating a configuration of an image processing apparatus according to an embodiment. FIG. 3 is a block diagram illustrating a configuration of a first image processor included in the image processing apparatus.

As illustrated in FIGS. 2 and 3, the image processing apparatus 100 includes a content interface 120 configured to receive content data from the content sources 2 to 7, a first controller 150 configured to control the operation of the image processing apparatus 100 and process image data included in the content data received by the content interface 120, and a first communication interface 130 configured to transmit an image data stream processed by the first controller 150 to the display apparatus 200.

The content interface 120 may include input terminals 121 and a tuner 122 configured to receive content data from the content sources 2 to 7.

The input terminals 121 connect the image processing apparatus 100 with the content sources 2 to 7 together with one or more cables. In other words, the image processing apparatus 100 may receive content data from the content sources 2 to 7 via the input terminals 121.

The input terminals 121 may include, for example, a component (YPbPr/RGB) terminal, a composite video blanking and sync (CVBS) terminal, a high definition multimedia interface (HDMI) terminal, an Ethernet terminal, a universal serial bus (USB) terminal.

The tuner 122 extracts a signal of a channel selected by the user from a plurality of broadcast signals received by the antenna 2 or cable. For example, the tuner 122 may pass a broadcast signal having a frequency corresponding to the channel selected by the user and block broadcast signals having the other frequencies among the plurality of broadcast signals received by the antenna 2.

When a channel is selected by the user, the first controller 150 transmits a channel select signal to the tuner 122 and the tuner 122 may extract a signal of the channel selected by the user among the plurality of broadcast signals according to the channel select signal of the first controller 150.

The tuner 122 may include an analog broadcast tuner to select an analog broadcast signal selected from a plurality of analog broadcast signals, a digital broadcast tuner to select a digital broadcast signal selected from a plurality of digital broadcast signals, and a satellite broadcast tuner to select a satellite broadcast signal selected from a plurality of satellite broadcast signals.

As described above, the content interface 120 may receive content data from the plurality of content sources 2 to 7 via the input terminals 121 and/or the tuner 122 and output content data selected from the content data received from the plurality of content sources 2 to 7 to the first controller 150 in accordance with a control signal of the first controller 150.

In addition, the content interface 120 may detect reception of content data via the input terminals 121 and/or the tuner 122 and transmit a content sensing signal to the first controller 150 in accordance with a sensing result of the content sources 2 to 7.

The user may select one content source among the plurality of content sources 2 to 7 connected to the image processing apparatus 100. Particularly, when terrestrial or cable broadcasting is selected, the user may select a channel to view.

When the user selects one of the content sources 2 to 7, the first controller 150 transmits a content select signal to the content interface 120 and the content interface 120 may select one content source from the plurality of content sources 2 to 7 in accordance with the content select signal of the first controller 150. In addition, the tuner 122 may output content data received by the selected content source 2 to 7 to the first controller 150.

The first controller 150 may control the operation of the content interface 120 and/or the first communication interface 130 according to user input and/or an operating state of the display apparatus 200. For example, when one of the content sources 2 to 7 is selected by the user, the first controller 150 may control the content interface 120 to receive content data from the content source selected by the content interface 120. In addition, the first controller 150 may control an image processing rate of the first controller 150 in accordance with a transmission rate of image data streams of the first communication interface 130.

In addition, the first controller 150 may process content data received from the content interface 120 and generate image data streams from the content data. Also, the first controller 150 may output the image data streams to the first communication interface 130.

The first controller 150 may decode a plurality of images (image frames) from video data included in the content data or form (render) the plurality of image frames from video data. The first controller 150 may compress and/or encode the plurality of image frames into image data streams to transmit the plurality of image frames to the display apparatus 200. Also, the first controller 150 may output the compressed and/or encoded image data streams.

The first controller 150 may structurally include a first microprocessor 151 and a first memory 152 as illustrated in FIG. 2.

The first memory 152 may store programs and data to control the image processing apparatus 100. In addition, the first memory 152 may temporarily store data generated while controlling the image processing apparatus 100.

The first memory 152 may also store programs and data for image processing. For example, the first memory 152 may store programs and data for decoding and/or rendering of images and programs and data for encoding of image frames. The first memory 152 may also temporarily store data generated while processing images.

The first memory 152 may include volatile memory to temporarily store data such as Static Random Access Memory (S-RAM) and Dynamic Random Access Memory (D-RAM) and non-volatile memory for long storage of data such as Read Only Memory (ROM), Erasable Programmable Read Only Memory (EPROM), and Electrically Erasable Programmable Read Only Memory (EEPROM).

The first microprocessor 151 may receive content sensing data from the content interface 120 and receive user input data from the first communication interface 130. In addition, the first microprocessor 151 may process the content sensing data and the user input data and generate a control signal to control the image processing apparatus 100 based on the data processing. For example, the first microprocessor 151 may generate a content select signal and transmit the content select signal to the content interface 120 to receive content data from one of the content sources 2 to 7 in accordance with the content sensing data from the content interface 120 and the user input data from the first communication interface 130.

The first microprocessor 151 may also perform image processing. For example, the first microprocessor 151 may decode and/or render images and encode image frames by using programs and data stored in the first memory 152.

The first microprocessor 151 may include an operation circuit to perform logic operations and arithmetic operations and a storage circuit to store computed data.

Also, the first controller 150 may functionally include an image renderer 160, an event generator 170, and an image encoder 180 as illustrated in FIG. 3.

The image renderer 160 may decode or render images from content data output from the content interface 120. In other words, the image renderer 160 may generate a plurality of image frames.

The event generator 170 may generate an event signal to change the loss/delay mode of the image processing apparatus 100 according to the type of the content sources 2 to 7 and/or content and/or the user input.

For example, in the case of content not requiring a response to the user input (e.g., movie and drama), the event generator 170 may output a low-loss/high-delay event signal to change the loss/delay mode of the image processing apparatus 100 to the low-loss/high-delay mode. In the case of content requiring a quick response to the user input (e.g., game), the event generator 170 may output a high-loss/low-delay event signal to change the loss/delay mode of the image processing apparatus 100 to the high-loss/low-delay mode.

When the content source 2 to 7 is the image reproducing device 6 or the video service server 3, the event generator 170 may output the low-loss/high-delay event signal to change the loss/delay mode of the image processing apparatus 100 to the low-loss/high-delay mode. When the content source 2 to 7 is the gaming device 5 or the game service server 4, the event generator 170 may output the high-loss/low-delay event signal to change the loss/delay mode of the image processing apparatus 100 to the high-loss/low-delay mode.

Also, if there is no user input within a predetermined time, the event generator 170 may output the low-loss/high-delay event signal to change the loss/delay mode of the image processing apparatus 100 to the low-loss/high-delay mode. When user input is received, the event generator 170 may output the high-loss/low-delay event signal to change the loss/delay mode of the image processing apparatus 100 to the high-loss/low-delay mode.

The image encoder 180 may compress and/or encode image frames decoded or rendered by the image renderer 160 and output a compressed and/or encoded image data stream.

The image encoder 180 may compress and/or encode image frames by using various image compression algorithms. For example, the image encoder 180 may compress and/or encode image frames by using image compression algorithms such as Moving Picture Experts Group (MPEG)-4 and High Efficiency Video Coding (HEVC).

The image encoder 180 may compress and/or encode image frames with various loss rates of image information and various time delays according to an encoding option. In addition, when the capacity (or size) of an output image data stream is preset, the loss rate of image information is in inversely proportional to or has trade off relation with an encoding time delay. That is, the image encoder 180 may operate in various loss/delay modes having various loss rates of image information and various encoding time delays.

The loss/delay mode of the image encoder 180 may be changed according to the event signal output from the event generator 170. For example, when the high-loss/low-delay event signal is output from the event generator 170, the image encoder 180 may operate in the high-loss/low-delay mode. When the low-loss/high-delay event signal is output from the event generator 170, the image encoder 180 may operate in the low-loss/high-delay mode.

Examples and the operation of the image encoder 180 will be described in more detail.

Although the first microprocessor 151 and the first memory 152 have been described above with respect to the first controller 150, the embodiment is not limited thereto. For example, the first controller 150 may include a microcontroller in which microprocessor and a memory are integrated or include a plurality of microprocessors and a plurality of memories.

Referring back to FIG. 2, the first communication interface 130 may transmit an image data stream output from the first controller 150 to the display apparatus 200.

The first communication interface 130 includes a first communication terminal 131 configured to transmit image data streams in a wired manner and a first communication antenna 132 configured to transmit image data streams in a wireless manner.

For example, the first communication interface 130 may transmit image data streams to the display apparatus 200 via a cable connected to the first communication terminal 131. Also, the first communication interface 130 may radiate image data streams into a free space via the first communication antenna 132 and the display apparatus 200 may receive the radiated image data streams. The first communication interface 130 may transmit the image data streams to the display apparatus 200 using various wireless communications standards such as WIFI™ Bluetooth™, and Zigbee™.

In addition, the first communication interface 130 may receive data from the display apparatus 200. For example, the first communication interface 130 may receive user input data and operation data of the display apparatus 200 from the display apparatus 200.

Figure 4:
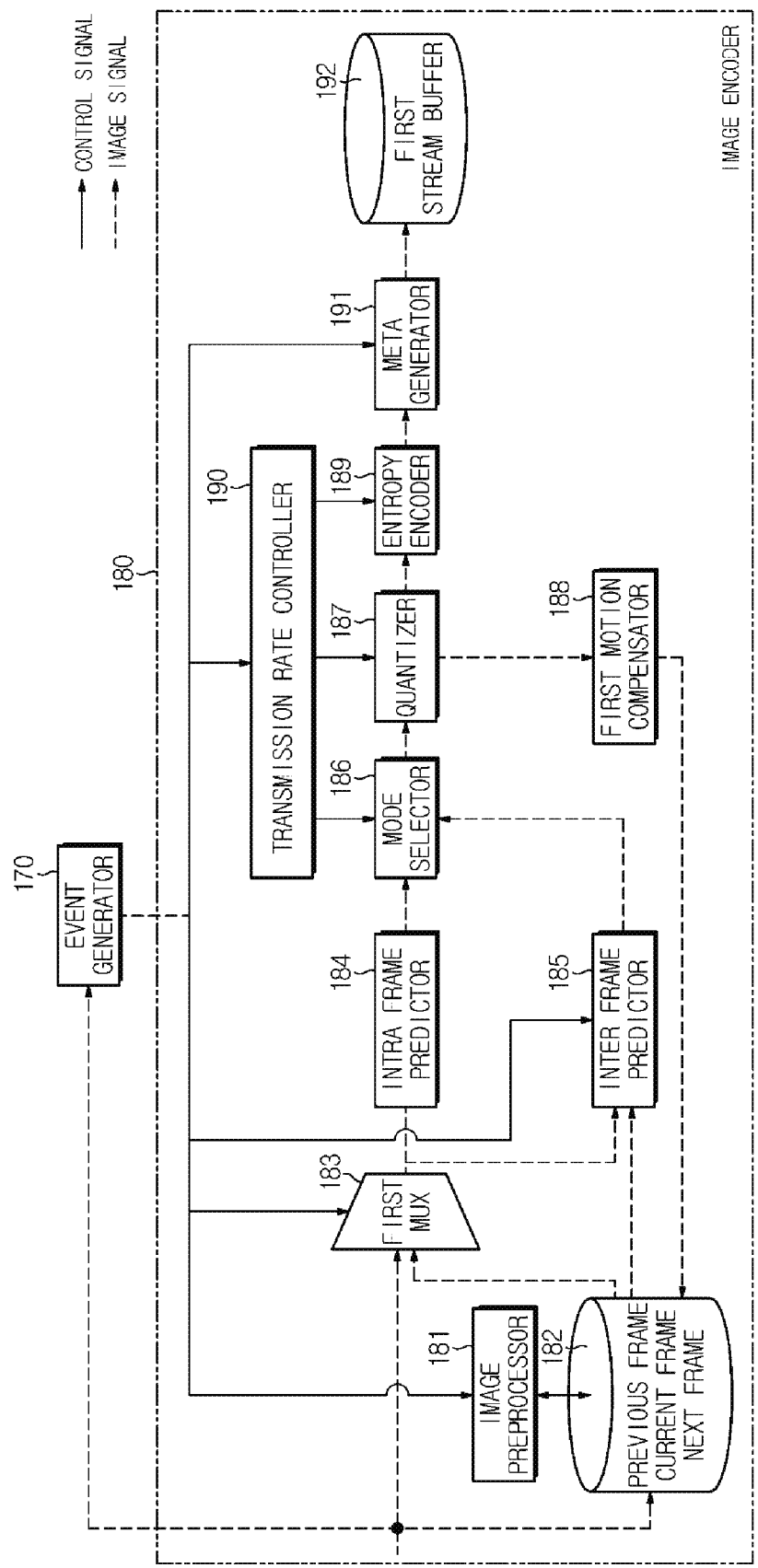
FIG. 4 is a block diagram illustrating an encoder included in an image processing apparatus according to an embodiment.

FIG. 4 is a block diagram illustrating an encoder included in an image processing apparatus according to an embodiment.

As described above, the image encoder 180 of the image processing apparatus 100 may compress and/or encode image frames by using various image compression algorithms such as MPEG-4 and HEVC.

Hereinafter, an example of the image encoder 180 will be described with reference to FIG. 4.

As illustrated in FIG. 4, the image encoder 180 may include an image preprocessor 181, a first frame buffer 182, a first multiplexer 183, an intra frame predictor 184, an inter frame predictor 185, a mode selector 186, a quantizer 187, a first motion compensator 188, an entropy encoder 189, a transmission rate controller 190, a meta generator 191, and a first stream buffer 192.

The image preprocessor 181 may receive image frames from the image renderer 160 and preprocess the received image frames. For example, the image preprocessor 181 may analyze an image by histogram of the image frames or improve signal to noise ratios (SNRs) of the image frames.

When the image preprocessor 181 is activated and image preprocessing is performed, a loss rate of image compression may decrease and an encoding time delay for image encoding may increase.

Thus, the image encoder 180 may activate or deactivate the image preprocessor 181 according to the loss/delay mode. For example, the image encoder 180 may activate the image preprocessor 181 in the low-loss/high-delay mode and deactivate the image preprocessor 181 in the high-loss/low-delay mode.

Specifically, the image preprocessor 181 may receive an event signal from the event generator 170 and may be activated or deactivated according to the event signal. For example, the image preprocessor 181 may be activated upon receiving the low-loss/high-delay event signal, and the image preprocessor 181 may be deactivated upon receiving the high-loss/low-delay event signal.

In addition, the loss/delay modes of the image encoder 180 may be classified into three or more stages. According to the stage of the loss/delay mode, a plurality of functions performed by the image preprocessor 181 may be activated or deactivated.

The first frame buffer 182 may receive image frames from the image renderer 160 and temporarily store the received image frames. For example, the first frame buffer 182 may store "previous image frame", "current image frame", "next image frame", and the like. In this regard, the terms "previous", "current", and "next" are distinguished from each other based on the image frame current being processed by the image encoder 180. When the image renderer 160 sequentially outputs a first image frame, a second image frame, and a third image renderer, the image encoder 180 may process the second image frame after receiving all of the first, second, and third image frames. In this regard, the "previous image frame" indicates the first image frame, the "current image frame" indicates the second image frame, and the "next image frame" indicates the third image frame.

If the first frame buffer 182 sores the "previous image frame" and the image encoder 180 compresses and/or encode the "current image frame" by using the "previous image frame" and the "current image frame", a time delay for compression and/or encoding may not occur in the image encoder 180. On the contrary, if the first frame buffer 182 stores the "previous image frame", the "current image frame", and the "next image frame" and the image encoder 180 processes the "current image frame" by using the "previous image frame", the "current image frame", and the "next image frame", a time delay of at least one frame may occur in the image encoder 180.

Thus, the image encoder 180 may change image frames stored in the first frame buffer 182 according to the loss/delay mode. For example, the image encoder 180 may store all of the "previous image frame", the "current image frame", and the "next image frame" in the first frame buffer 182 in the low-loss/high-delay mode and may store only the "previous image frame" and the "current image frame" in the first frame buffer 182 in the high-loss/low-delay mode.

Specifically, the first frame buffer 182 may receive an event signal from the event generator 170 and store "previous", "current", and "next" image frames according to the event signal. For example, the first frame buffer 182 may store "previous", "current", and "next" image frames upon receiving the low-loss/high-delay event signal and may store "previous" and "current" image frames upon receiving the high-loss/low-delay event signal.

In addition, the loss/delay modes of the image encoder 180 may be classified into three or more stages. According to the stage of the loss/delay mode, the image encoder 180 may change the number of "previous image frames" and the number of "next image frames" stored in the first frame buffer 182.

The first multiplexer 183 may receive a plurality of image frames from the image renderer 160 and the first frame buffer 182 and output one of the plurality of image frames. For example, the first multiplexer 183 may output an image frame currently being received from the image renderer 160 or an image frame stored in the first frame buffer 182.

The image encoder 180 may change an image frame output from the first multiplexer 183 according to the loss/delay mode. For example, the image encoder 180 may control the first multiplexer 183 to output a "current image frame (image frame currently being processed by the image encoder)" stored in the first frame buffer 182 in the low-loss/high-delay mode and control the first multiplexer 183 to output an image frame currently being received from the image renderer 160 in the high-loss/low-delay mode.

Specifically, the first frame buffer 182 may receive an event signal from the event generator 170 and change an image frame output according to the event signal. The first multiplexer 183 may output the "current image frame (image frame currently being processed by the image encoder)" stored in the first frame buffer 182 upon receiving a low-loss/high-delay event signal and output the image frame currently being received from the image renderer 160 upon receiving a high-loss/low-delay event signal.

In addition, the loss/delay modes of the image encoder 180 may be classified into three or more stages. According to the stage of the loss/delay mode, the image encoder 180 may change the image frame output from the first multiplexer 183.

The intra frame predictor 184 may compress an image frame by using the "current image frame" and output an intra frame. For example, the intra frame predictor 184 may compress an image frame by using a correlation between pixels or pixel blocks in the "current image frame". In other words, the intra frame predictor 184 may compress the image frame by using spatial redundancy in the "current image frame".

The inter frame predictor 185 may compress an image frame by using temporally consecutive image frames (e.g., previous image frames and current image frame) and output an inter frame. For example, the inter frame predictor 185 may compress the image frame by using a correlation between spatially corresponding pixels or pixel blocks between the "previous image frame" and the "current image frame". In other words, the inter frame predictor 185 compress and/or encode the image frame by using temporal redundancy between the "previous image frame" and the "current image frame".

More specifically, the inter frame predictor 185 may determine an amount of change, i.e., a motion vector, of the current image frame from a reference image frame and generate the inter frame based on the determine motion vector. In this case, an intra frame of the intra frame predictor 184 may be used as the reference image frame.

In addition, the inter frame predictor 185 may compress and/or encode image frames by using temporally various image frames according to the loss/delay mode. For example, the inter frame predictor 185 may receive an event signal from the event generator 170. Also, the inter frame predictor 185 may compress and/or encode the image frame by using the "previous image frame", the "current image frame", and the "next image frame" in the low-loss/high-delay mode. The inter frame predictor 185 may compress and/or encode the image frame by using the "previous image frame" and the "current image frame" in the high-loss/low-delay mode.

The mode selector 186 may output either the intra frame of the intra frame predictor 184 or the inter frame of the inter frame predictor 185.

The quantizer 187 may quantize an output of the mode selector 186, i.e., the intra frame or inter frame, using a quantization table. As a result of quantization, image information may be lost in an initial image frame and the file size (capacity) of the image frame may be reduced.

The first motion compensator 188 may restore a decoded image frame from an output of the quantizer 187. For example, the first motion compensator 188 may identify the intra frame among image frames and perform motion compensation on the intra frame based on the motion vector of the intra frame. As a result of motion compensation, the "current image frame" encoded by the intra frame predictor 184 and the inter frame predictor 185 may be restored (decoded).

The first motion compensator 188 may perform post-processing on the decoded "current image frame" and output the post-processed "current image frame" to the first frame buffer 182. In addition, the first frame buffer 182 may store the "current image frame" decoded by the first motion compensator 188 as a "previous image frame".

The entropy encoder 189 may perform entropy-encoding on the output (intra frame and/or inter frame) of the quantizer 187. Specifically, the entropy encoder 189 converts a unique symbol among outputs of the quantizer 187 into a code. In this regard, a length of the converted code may vary according to the probability of outputting the symbol. In other words, a symbol with a high probability of output may be encoded into a short code and a symbol with a low probability of output may be encoded into a long code.

In addition, the entropy encoder 189 may output an image data stream in which the image frames are compressed and/or encoded.

The transmission rate controller 190 may control image processing rates of the mode selector 186, the quantizer 187, and the entropy encoder 189. For example, the transmission rate controller 190 may control the image processing rates of the mode selector 186, the quantizer 187, and the entropy encoder 189 according to the capacity of the first stream buffer 192 and the size (or capacity) of the encoded image frame.

Particularly, the transmission rate controller 190 may control the image processing rate according to the loss/delay mode of the image encoder 180. For example, the transmission rate controller 190 may receive an event signal from the event generator 170 and control the image processing rates of the mode selector 186, the quantizer 187, and the entropy encoder 189 at low levels in order to minimize the loss of image information and increase the compression rate in the low-loss/high-delay mode. Also, the transmission rate controller 190 may control the image processing rates of the mode selector 186, the quantizer 187, the entropy encoder 189 at high levels in order to minimize the time delay for image encoding in the high-loss/low-delay mode.

In addition, the loss/delay modes of the image encoder 180 may be classified into three or more stages. The image encoder 180 may control the transmission rate controller 190 to modify the image processing rates of the mode selector 186, the quantizer 187, and the entropy encoder 189 according to the stage of the loss/delay mode.

The meta generator 191 may generate metadata about the loss/delay mode of the image encoder 180 and add the metadata to image stream data. For example, the meta generator 191 may receive an event signal from the event generator 170. The meta generator 191 may add metadata indicating the low-loss/high-delay mode to the image stream data in the low-loss/high-delay mode. Also, the meta generator 191 may add metadata indicating the high-loss/low-delay mode to the image stream data in the high-loss/low-delay mode.

When the loss/delay mode is changed from the low-loss/high-delay mode to the high-loss/low-delay mode, encoded image frames may be duplicates. As an encoding delay decreases, image frame data of a previous image frame (high-delay encoding) and image frame data of a current image frame (low-delay encoding) may be simultaneously output. When the loss/delay mode is changed from the low-loss/high-delay mode to the high-loss/low-delay mode, the image encoder 180 may drop any one of duplicate image frame data.

In addition, when the loss/delay mode is changed from the high-loss/low-delay mode to the low-loss/high-delay mode, some image frames included in an image data stream may be missing. Due to an increase in the encoding delay, a time delay of one or more frames may occur between image frame data of a previous image frame (low-delay encoding) and image frame data of a current image frame (high-delay encoding). To supplement this, the meta generator 191 may add metadata on image frame missing to image stream data such that the display apparatus 200 supplements missing image frames when the loss/delay mode is changed from the high-loss/low-delay mode to the low-loss/high-delay mode.

The first stream buffer 192 may store an image data stream output from the meta generator 191 until the image data stream is transmitted to the display apparatus 200 via the first communication interface 130.

As described above, the image processing apparatus 100 may include the event generator 170 configured to change the loss/delay mode in accordance with the type of the content sources 2 to 7 and/or content and/or the user input and the image encoder 180 configured to operate in a different loss rate of image information and a different encoding time delay according to the loss/delay mode.

Figure 5:
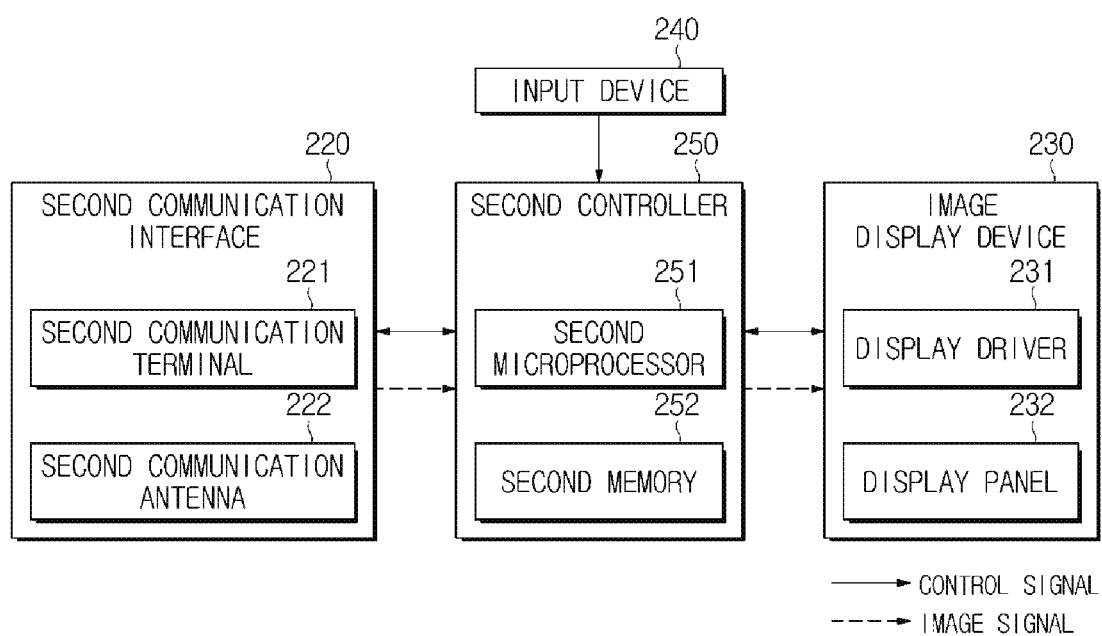
FIG. 5 is a block diagram illustrating a configuration of a display apparatus according to an embodiment.
Figure 6:
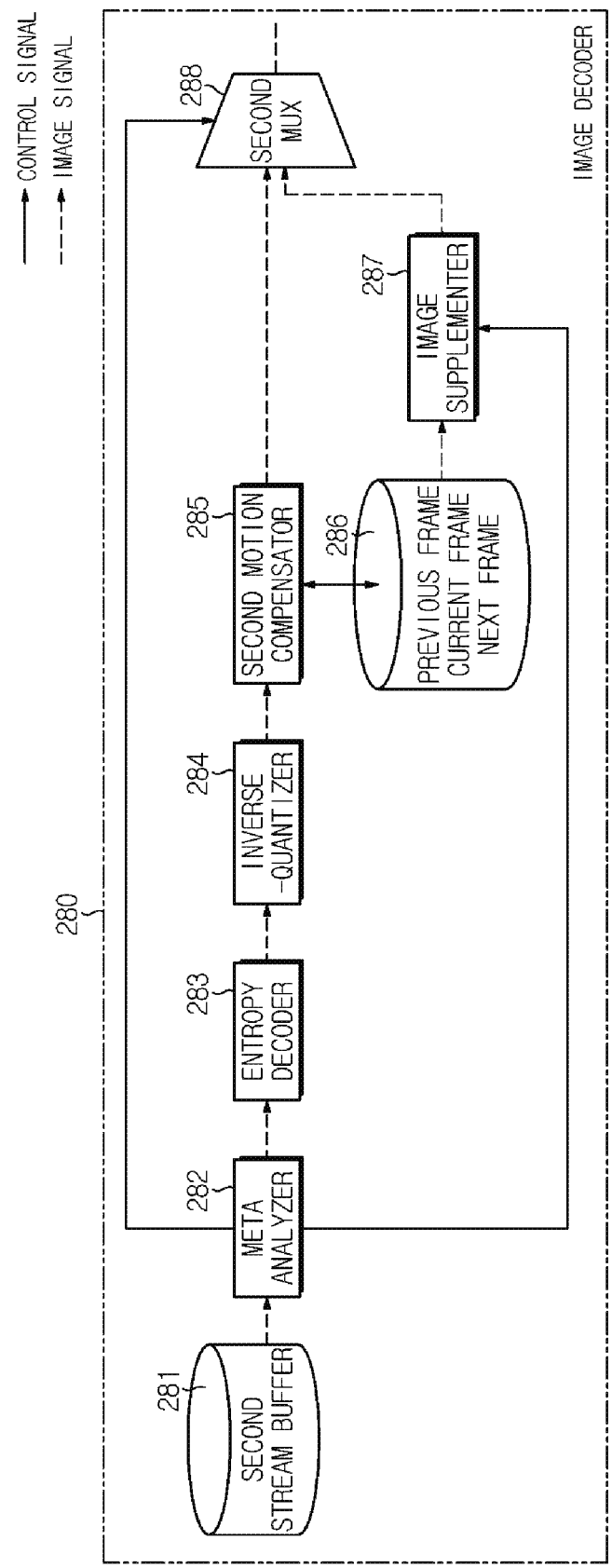
FIG. 6 is a block diagram illustrating a decoder included in the display apparatus according to an embodiment.

FIG. 5 is a block diagram illustrating a configuration of a display apparatus according to an embodiment. FIG. 6 is a block diagram illustrating a decoder included in the display apparatus according to an embodiment.

As illustrated in FIG. 5, the display apparatus 200 includes an input device 240 configured to receive user input, a second communication interface 220 configured to receive an image data stream from the image processing apparatus 100, a second controller 250 configured to control the operation of the display apparatus 200 and process the image data stream received by the second communication interface 220, and an image display device 230 configured to display an image frame processed by the second controller 250.

The input device 240 may receive user input and output an electrical signal corresponding to the user input to the second controller. For example, the input device 240 may receive an input to select/change a content source 2 to 7, select/change content, and/or select/change a broadcast channel from a user. In addition, the input device 240 may receive user input about the game content while the image display system 1 is providing game content.

The input device 240 may include various types of input devices such as a switch, a keyboard, a dial, a mouse, a pointer, and a trackball.

In addition, the input device 240 may include a remote control separated from the display apparatus 200. The remote control may receive user input from the user and transmit the received user input to the display apparatus 200 via infrared transmission, or the like.

The second communication interface 220 may receive an image data stream from the image processing apparatus 100 and output the received image data stream to the second controller 250.

The second communication interface 220 includes a second communication terminal 221 configured to receive an image data stream in a wired manner and a second communication antenna 222 configured to receive an image data stream in a wireless manner.

For example, the second communication interface 220 may receive the image data stream from the image processing apparatus 100 via a cable connected to the second communication terminal 221. In addition, the second communication interface 220 may receive the image data stream from the free space via the second communication antenna 222. The second communication interface 220 may receive the image data streams from the image processing apparatus 100 using various wireless communications standards such as WIFI™, Bluetooth™, and Zigbee™.

Also, the second communication interface 220 may transmit data to the image processing apparatus 100. For example, the second communication interface 220 may transmit user input data and operation data of the display apparatus 200 to the image processing apparatus 100.

The second controller 250 may control the operation of the second communication interface 220 and/or the image display device 230 according to user input and/or an operating state of the display apparatus 200. For example, when one of the content sources 2 to 7 is selected via the input device 240, the second controller 250 may transmit user input data allowing the image processing apparatus 100 to select one of the content sources 2 to 7 via the second communication interface 220. In addition, the second controller 250 may control an image processing rate of the second controller 250 according to an image data stream receiving rate of the second communication interface 220.

In addition, the second controller 250 may process the image data stream received by the second communication interface 220 and generate image frame data from the image data stream. Specifically, the second controller 250 may decode the image data stream and generate image frame data from the image data stream thereby. In addition, the first controller 150 may output image frame data to the image display device 230.

The second controller 250 may structurally include a second microprocessor 251 and a second memory 252 as illustrated in FIG. 5.

The second memory 252 may store programs and data to control the display apparatus 200. In addition, the second memory 252 may temporarily store data generated while controlling the display apparatus 200.

The second memory 252 may also store programs and data required for image processing. For example, the second memory 252 may store programs and data for decoding. The second memory 252 may also temporarily store data generated while processing images.

The second memory 252 may include volatile memory to temporarily store data such as S-RAM and D-RAM and non-volatile memory for long term storage of data such as ROM, EPROM, and EEPROM.

The second microprocessor 251 may also receive user input data from the input device 240. In addition, the second microprocessor 251 may process the user input data and generate a control signal to control the display apparatus 200 based on the data processing. For example, the second microprocessor 251 may generate user input data to select one of the content sources 2 to 7 according to user input data received from the input device 240.

The second microprocessor 251 may also perform image processing. For example, the second microprocessor 251 may decode image frames based on programs and data stored in the second memory 252.

The second microprocessor 251 may include an operation circuit to perform logic operations and arithmetic operations and a storage circuit to store computed data.

In addition, the second controller 250 may include an image decoder 280 as illustrated in FIG. 6.

The image decoder 280 may decode an image data stream and output decoded image frame data.

The image decoder 280 may decode the image data stream by using various image compression algorithms in accordance with the image compression algorithm of the image encoder 180 of the image processing apparatus 100. For example, the image decoder 280 may decode the image data stream by using image compression algorithms such as MPEG-4 and HEVC.

The image decoder 280 may identify the encoding option of the image encoder 180 based on metadata included in the image data stream and decode the image data stream based on a decoding option corresponding to the encoding option.

As described above, the image encoder 180 may operate in the low-loss/high-delay mode or the high-loss/low-delay mode according to the loss rate of image information and the encoding time delay. The image decoder 280 may decode the image data stream according to a low-loss/high-delay decoding option corresponding to the low-loss/high-delay mode of the image encoder 180 or according to a high-loss/low-delay decoding option corresponding to the high-loss/low-delay mode of the image encoder 180.

In addition, when image frames are missing by a change of the loss/delay mode of the image encoder 180, the image decoder 280 may supplement the missing image frames by repetition or interpolation of image frame.

Examples and the operation of decoder 280 will be described in more detail.

Referring back to FIG. 5, the image display device 230 includes a display panel 232 configured to visually display an image and a display driver 231 configured to drive the display panel 232.

The display panel 232 may generate an image according to image frame data received from the display driver 231 and output the image.

The display panel 232 may include pixels serving as a unit for displaying an image. Each of the pixels may receive an electric signal indicating image data and output an optical signal corresponding to the received electrical signal. As described above, an image may be displayed on the display panel 232 by a combination of optical signals output from a plurality of pixels.

The display panel 232 may include a CRT panel, a LCD panel, a LED panel, an OLED panel, a PDP, a FED panel, and the like. However, the display panel 232 is not limited thereto and may employ any display device capable of visually displaying an image corresponding to image data.

The display driver 231 receives the image data from the second controller 250 according to a control signal of the second controller 250 and drives the display panel 232 to display an image corresponding to the received image data.

Specifically, the display driver 231 transmits an electrical signal corresponding to the image frame data to each of the pixels constituting the display panel 232. Particularly, the display driver 231 may transmit the electrical signal to each of the pixels by using various methods to transmit the electrical signal to all of the pixels constituting the display panel 232 within a short time.

As described above, when the display driver 231 transmits the electrical signal corresponding to the image data to each of the pixels constituting the display panel 232, each pixel outputs an optical signal corresponding to the received electrical signal and the optical signals respectively output from the pixels are combined to display one image on the display panel 232.

As described above, the image decoder 280 of the display apparatus 200 may decode the image data stream by using various image compression algorithms such as MPEG-4 and HEVC.

Hereinafter, an example of the image decoder 280 will be described with reference to FIG. 6.

As illustrated in FIG. 6, the image decoder 280 may include a second stream buffer 281, a meta analyzer 282, an entropy decoder 283, an inverse-quantizer 284, a second motion compensator 285, a second frame buffer 286, an image supplementer 287, and a second multiplexer 288.

The second stream buffer 281 may store the image data stream received by the second communication interface 220 until decoding.

The meta analyzer 282 may extract metadata from the image data stream received by the second communication interface 220 and identify the decoding option based on the metadata of the image data stream.

In addition, the meta analyzer 282 may identify image frame missing caused by changing the loss/delay mode of the image encoder 180 based on the metadata of the image data stream. Upon determination that there is image frame missing, the meta analyzer 282 may output a frame supplement signal to the second multiplexer 288.

The entropy decoder 283 may perform entropy-decoding on the image data stream from which the metadata is removed. As described above, the entropy encoder 189 converts a unique symbol into a code. In this case, a length of the converted code may vary according to the probability of outputting the symbol. Thus, the entropy decoder 283 converts the converted code to the symbol (or image frame data) corresponding thereto.

The inverse-quantizer 187 may inverse-quantize the image frame data output from the entropy decoder 283 by using image frames stored in the second frame buffer 286 and the quantization table.

The second motion compensator 285 may restore an image frame from the inversely quantized image frame.

For example, the second motion compensator 285 may perform motion compensation on a "previous image frame" stored in the second frame buffer 286 based on a motion vector of an inter frame. As a result of motion compensation, a "current image frame" encoded by the image encoder 180 may be restored (decoding).

In addition, the second motion compensator 285 may perform forward motion compensation on the "previous image frame" and reverse motion compensation on a "next image frame" based on the motion vector of the inter frame. The second motion compensator 285 may restore (decoding) the "current image frame" by using the forward motion compensation and reverse motion compensation.

The second motion compensator 285 may perform post-processing on the decoded "current image frame" and output the post-processed "current image frame" to the second frame buffer 286. The second frame buffer 286 may store the image frame output from the second motion compensator 285 as a "previous image frame".

In addition, the second motion compensator 285 may output the post-processed "current image frame" to the second multiplexer 288.

The second frame buffer 286 may temporarily store the image frame output from the second motion compensator 285. For example, the second frame buffer 286 may store the "previous image frame", "current image frame", "next image frame", and the like. In this regard, the "current image frame" may indicate an image frame currently output from the image decoder 280 to the image display device 230 and the "next image frame" may indicate an image frame decoded by the image decoder 280 but not output to the image display device 230 yet.

If image frames are missing, the image supplementer 287 may supplement the missing image frame.

As described above, when the loss/delay mode of the image encoder 180 is changed from the high-loss/low-delay mode to the low-loss/high-delay mode, image frames may be missing. Specifically, as an encoding delay increases, a time delay of at least one frame may occur between image frame data of a previous image frame (low-delay encoding) and image frame data of a current image frame (high-delay encoding). To supplement this, when the loss/delay mode is changed from the high-loss/low-delay mode to the low-loss/high-delay mode, the image encoder 180 may add metadata on image frame missing to image stream data.

The meta analyzer 282 may output the frame supplement signal to the image supplementer 287 based on the metadata and the image supplementer 287 may output a supplemented current image frame in response to reception of the frame supplement signal.

For example, the image supplementer 287 may output the "previous image frame" stored in the second frame buffer 286 as the "current image frame". In other words, the image decoder 280 may perform image frame repetition in response to image frame missing.

In addition, the image supplementer 287 may output an interpolated image between the "previous image frame" and the "next image frame" stored in the second frame buffer 286 as a "current image frame". In other words, the image decoder 280 may perform image frame interpolation in response to image frame missing.

The second multiplexer 288 may receive the "image frame" decoded by the second motion compensator 285 and the "image frame" supplemented by the image supplementer 287 and output any one of the received "image frames".

Specifically, upon receiving the frame supplement signal from the meta analyzer 282, the second multiplexer 288 may output the "image frame" supplemented by the image supplementer 287. In addition, if the frame supplement signal is not received from the meta analyzer 282, the second multiplexer 288 may output the "image frame" decoded by the second motion compensator 285.

As described above, the display apparatus 200 may include the image decoder 280 configured to decode an image encoded by the image processing apparatus 100. In addition, the image decoder 280 may repeat a previous image frame or generate an interpolated image frame between the previous image frame and the next image frame to supplement missing image frames caused by changing the loss/delay mode of the image processing apparatus 100.

Figure 7:
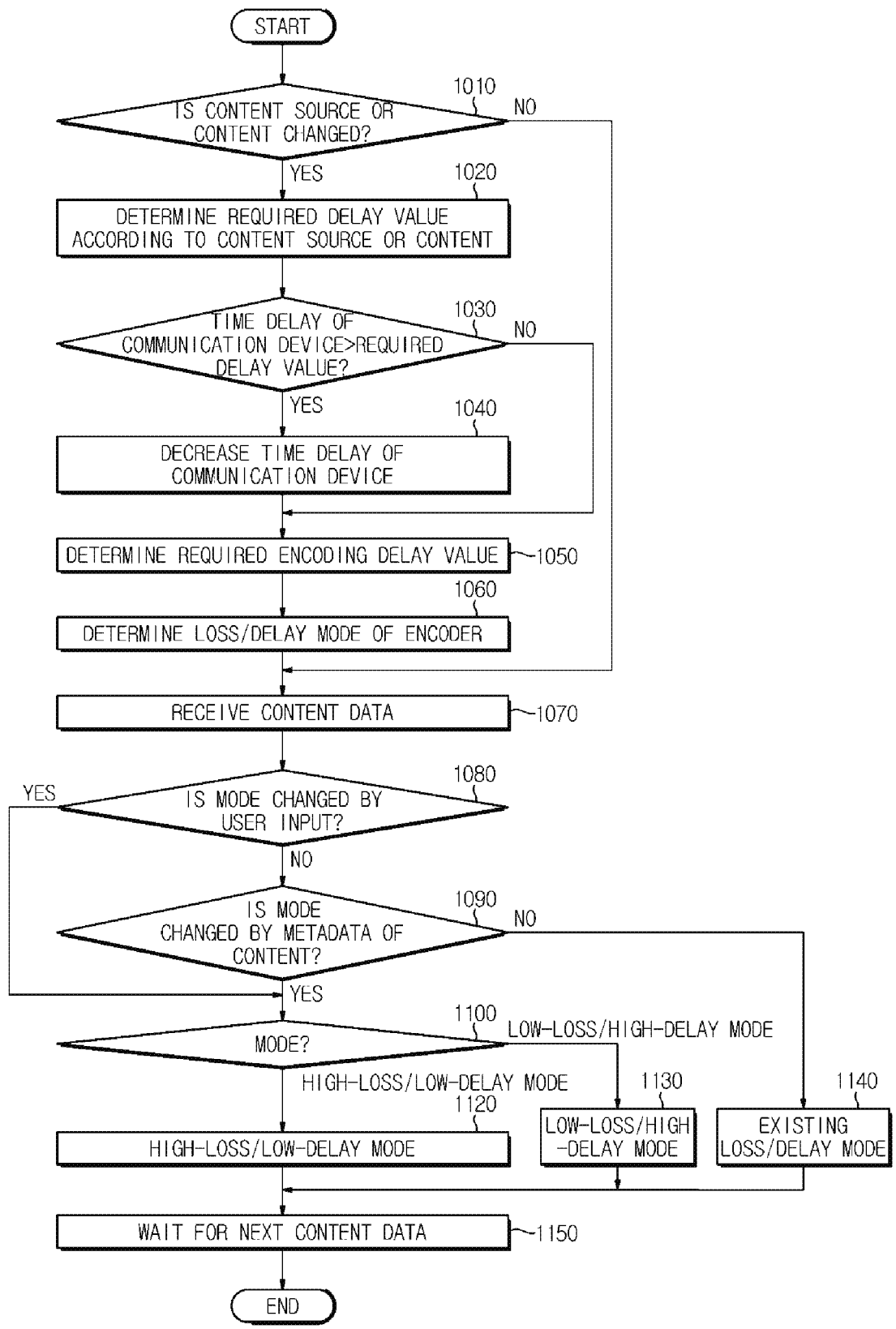
FIG. 7 is a flow chart illustrating an operation of changing a loss/delay mode of an image processing apparatus according to an embodiment.

FIG. 7 is a flowchart illustrating an operation of changing a loss/delay mode of an image processing apparatus according to an embodiment.

A method of changing the loss/delay mode of the image processing apparatus 100 will be described with reference to FIG. 7. The image processing apparatus 100 may perform the following loss/delay mode changing operation 1000 at predetermined time intervals.

The image processing apparatus 100 determines whether or not the content source 2 to 7 is changed or content received from the content sources 2 to 7 is changed (1010).

The image processing apparatus 100 may receive a change in the content source 2 to 7 or a change in content in response to user input and determine whether or not the content source 2 to 7 or content is changed by the user input.

The user may input an input to change the content source 2 to 7 by using a remote control. For example, the user may change the content source from the antenna 2 receiving broadcast content to the video service server 3 receiving video content. The user input regarding the change in the content source received via the remote control may be transmitted to the image processing apparatus 100 directly or via the display apparatus 200 and the image processing apparatus 100 may change the content source according to the user input.

The user may input an input to change content by using the remote control. For example, the user may change content within the video service server 3. The image processing apparatus 100 may change content according to the user input.

In addition, the image processing apparatus 100 may identify the change in the content sources 2 to 7 or content based on a signal input via the content interface 120.

The image processing apparatus 100 may identify the change in the content sources 2 to 7 based on a change in the input terminals 121. For example, when content data is received via a HDMI terminal while broadcast content is being received, the image processing apparatus 100 may identify the change in the content source 2 to 7.

The image processing apparatus 100 may identify the change in content based on metadata included in the input content data.

When the content source and/or content is changed (Yes of 1010), the image processing apparatus 100 identifies a required delay value in accordance with the content source or content (1020).

Required time delay may vary according to the content source and/or content. For example, when the content source 2 to 7 is located at a geographically closer position to the image processing apparatus 100 (e.g., the gaming device 5 or the image reproducing device 6), a time delay required by the content source 2 to 7 may be relatively long. On the contrary, when the content source 2 to 7 is located at a geographically farther position from the image processing apparatus 100 (e.g., the video service server 3 or the game service server 4, a time delay required by the content source 2 to 7 may be relatively short.

In addition, in the case of content not requiring user input such as movie content or broadcast content, a time delay required by the content may be relatively long. On the contrary, in the case of content requiring user input such as game content, a time delay required by the content may be relatively short.

The required delay value in accordance with the content source and/or content may be received from the content sources 2 to 7 or previously stored in the image processing apparatus 100.

The image processing apparatus 100 determines whether or not a time delay of the first communication interface 130 is greater than the required delay value (1030).

A time delay during which the first communication interface 130 modulates an image data stream and transmits the modulated data may occur. As a result, the time delay caused by the image processing apparatus 100 includes not only a time delay caused by the image encoder 180 of the first controller 150 but also a time delay caused by a communication operation of the first communication interface 130. In other words, the time delay of the image processing apparatus 100 may be approximately represented by a sum of the time delay of the image encoder 180 and the time delay of the first communication interface 130.

In order to satisfy the required delay value of the content source and/or content, the image processing apparatus 100 may compare the time delay of the first communication interface 130 with the required delay value first.

When the time delay of the first communication interface 130 is greater than the required delay value (Yes of 1030), the image processing apparatus 100 reduces the time delay of the first communication interface 130 (1040).

When the time delay of the first communication interface 130 is greater than the required delay value, the image processing apparatus 100 may reduce the time delay of the first communication interface 130 to satisfy the required delay value of the content source and/or content. For example, the image processing apparatus 100 may change a parameter related to the time delay of the first communication interface 130 such as time-interleave depth.

When the time delay of the first communication interface 130 is not greater than the required delay value (No of 1030) or the time delay of the first communication interface 130 decreases, the image processing apparatus 100 identifies a required encoding delay value (1050).

As described above, the time delay of the image processing apparatus 100 may be set to be smaller than the required delay value according to the content source and/or content to display an image in real time. Also, the time delay of the image processing apparatus 100 may be approximately represented by the sum of the time delay of the image encoder 180 and the time delay of the first communication interface 130.

Thus, the image processing apparatus 100 may calculate a required encoding delay value of the image encoder 180 from the required delay value according to the content source and/or content and the time delay of the first communication interface 130. For example, a difference between the required delay value according to the content source and/or content and the time delay of the first communication interface 130 may indicate the required encoding delay value of the image encoder 180.

The image processing apparatus 100 identifies the loss/delay mode of the image encoder 180 (1060).

The image processing apparatus 100 may identify the loss/delay mode of the image encoder 180 based on the required encoding delay value.

The image processing apparatus 100 may operate in a plurality of loss/delay modes according to the loss rate of image information and the time delay and may operate in any one of the plurality of loss/delay modes according to the required encoding delay value.

For example, when the required encoding delay value is equal to or greater than a preset reference delay, the image processing apparatus 100 sets the low-loss/high-delay mode as the loss/delay mode. When the required encoding delay value is less than the preset reference delay, the image processing apparatus 100 sets the high-loss/low-delay mode as the loss/delay mode.

When there is no change in the content source and/or content (No of 1010) or the loss/delay mode of the image encoder 180 is set, the image processing apparatus 100 receives content data from the content source 2 to 7 (1070).

The image processing apparatus 100 may receive content data from the content sources 2 to 7 via the content interface 120.

The image processing apparatus 100 determines whether to change the loss/delay mode of the image encoder 180 by user input while receiving the content data (1080).

The user input may be received via the input device 240 of the display apparatus 200. For example, user input to change the content source 2 to 7 and/or content may be received via a remote control. In addition, user input may be received via a separate input device using the game service server 4 or the gaming device 5 while playing a game.

Upon receiving the user input, the image processing apparatus 100 may change the loss/delay mode of the image encoder 180 to the high-loss/low-delay mode to quickly respond to the user input. In addition, when the user input is terminated, the image processing apparatus 100 may change the loss/delay mode of the image encoder 180 to the low-loss/high-delay mode to provide a high-quality image.

When the loss/delay mode of the image encoder 180 is not changed (No of 1080), the image processing apparatus 100 determines whether to change the loss/delay mode of the image encoder 180 by using metadata of content (1090).

The content received via the content interface 120 may include various types of metadata. Particularly, metadata may include a required delay value to display an image of content in real time. For example, when content requires a quick response to the user input, metadata of the content may include a required delay value for a quick response to the user input.

The image processing apparatus 100 may calculate a required encoding delay value from the required delay value included in metadata of content and change the loss/delay mode of the image encoder 180 according to the required encoding delay value.

Upon determination of the change in the loss/delay mode by user input and/or metadata of content (Yes of 1080 and Yes of 1090), the image processing apparatus 100 identifies the loss/delay mode to be changed (1100).

In the case of change in the loss/delay mode by the user input, the image processing apparatus 100 may change the loss/delay mode of the image encoder 180 to the high-loss/low-delay mode at the start of user input and change the loss/delay mode of the image encoder 180 to the low-loss/high-delay mode at the end of the user input.

In the case of change in the loss/delay mode by the metadata of content, the image processing apparatus 100 may calculate the required encoding delay value from the required delay value included in the metadata of content. In addition, when the required encoding delay value is equal to or greater than the preset reference delay, the image processing apparatus 100 may change the loss/delay mode of the image encoder 180 to the low-loss/high-delay mode. When the required encoding delay value is less than the preset reference delay, the image processing apparatus 100 may change the loss/delay mode of the image encoder 180 to the high-loss/low-delay mode.

When the loss/delay mode is changed to the high-loss/low-delay mode ("high-loss/low-delay mode" of 1100), the image processing apparatus 100 operates in the high-loss/low-delay mode (1120).

In the high-loss/low-delay mode, the image processing apparatus 100 may change the encoding option of the image encoder 180 to reduce the encoding time delay.

For example, the image processing apparatus 100 may deactivate the image preprocessor 181, store the "previous image frame" and the "current image frame" in the first frame buffer 182, and control the inter frame predictor 185 to generate an inter frame based on the "previous image frame" and the "current image frame".

In addition, when the loss/delay mode is changed to the low-loss/high-delay mode ("low-loss/high-delay mode" of 1100), the image processing apparatus 100 operates in the low-loss/high-delay mode (1130).

In the low-loss/high-delay mode, the image processing apparatus 100 may change the encoding option of the image encoder 180 to the low-loss/high-delay mode to reduce the loss rate of image information.

For example, the image processing apparatus 100 may activate the image preprocessor 181, store the "previous image frame", the "current image frame", and the "next image frame" in the first frame buffer 182, and control the inter frame predictor 185 to generate an inter frame based on the "previous image frame", the "current image frame", and the "next image frame".

In there is no change in the loss/delay mode caused by user input or metadata of content is not detected (No of 1090), the image processing apparatus 100 operates in a preset loss/delay mode (1140).

Next, the image processing apparatus 100 waits for next content data (1150).

As described above, the image processing apparatus 100 may change the loss/delay mode of the image encoder 180 according to the change in the content source, the change in content, user input and/or metadata of content. In addition, the image encoder 180 may set an encoding option to minimize the loss of image information or to minimize the encoding time delay according to the change of the loss/delay mode.

Figure 8:
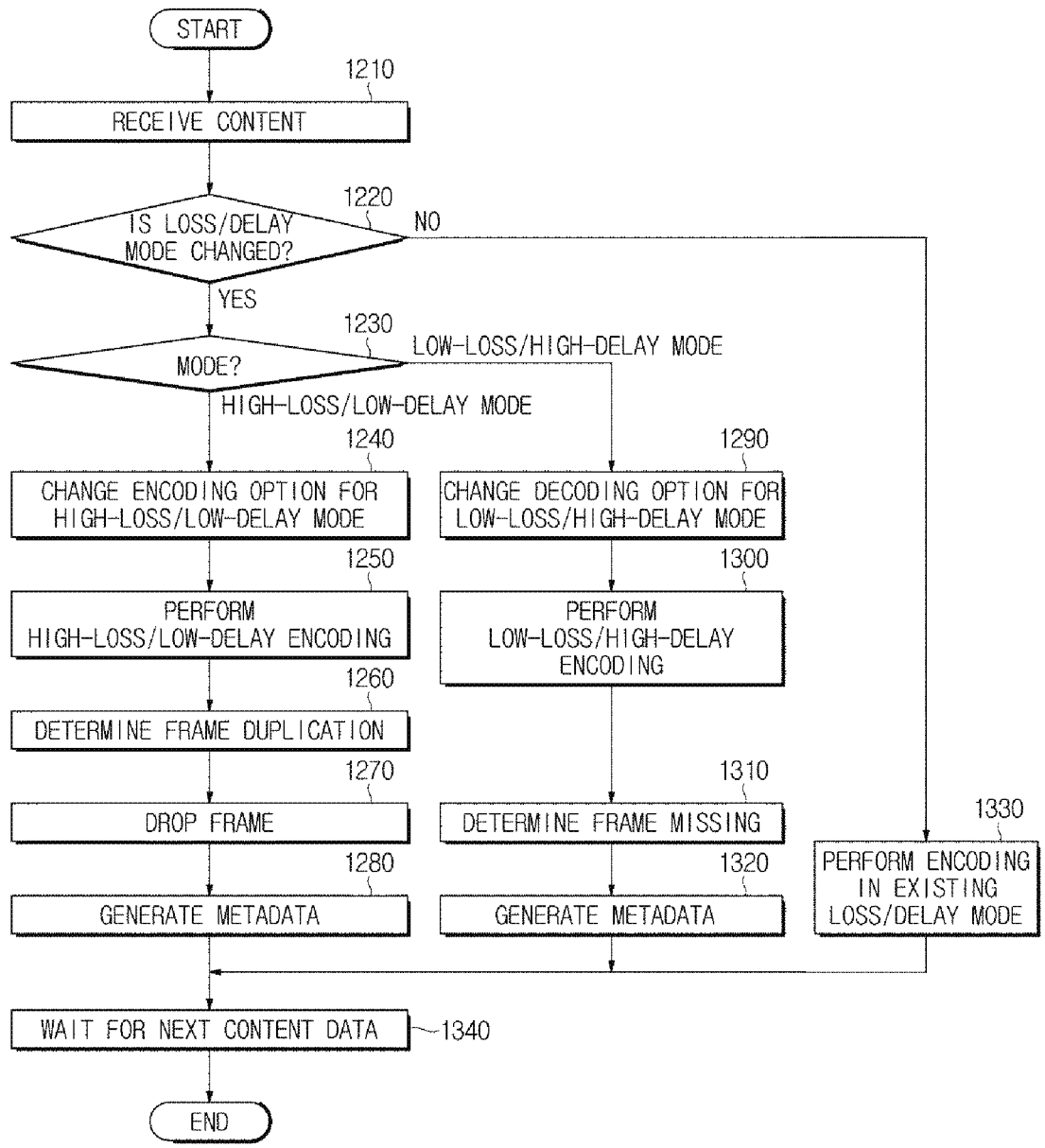
FIG. 8 is a flow chart illustrating an encoding operation of an image processing apparatus according to an embodiment.
Figure 9:
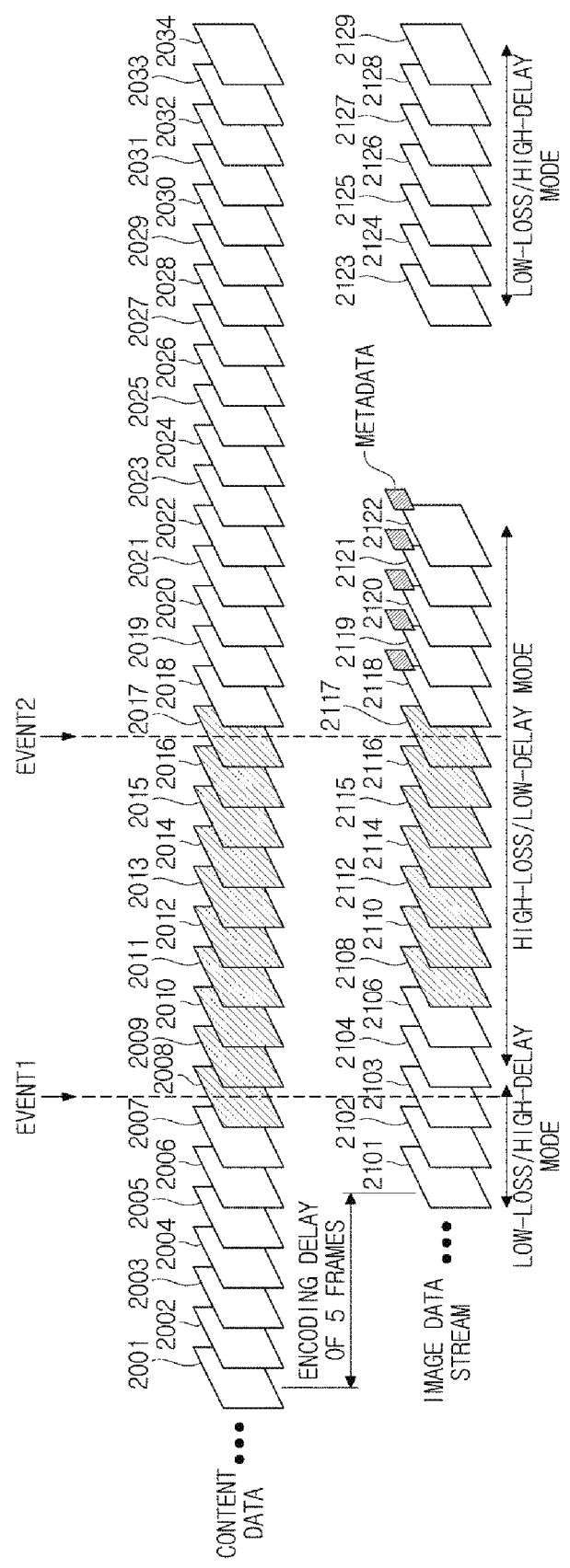
FIG. 9 is a view illustrating an example of encoding image frames according to an encoding operation such as the one illustrated with reference to FIG. 8.

FIG. 8 is a flowchart illustrating an encoding operation of an image processing apparatus according to an embodiment. FIG. 9 is a view illustrating an example of encoding of image frames according to an encoding operation such as the one illustrated in FIG. 8.

Referring to FIGS. 8 and 9, a method of encoding image frames performed by the image processing apparatus 100 will be described. The image processing apparatus 100 may perform the following encoding operation (1200) at predetermined time intervals.

The image processing apparatus 100 receives content data from the content source 2 to 7 (1210).

The image processing apparatus 100 may receive content data from the content source 2 to 7 via the content interface 120.

The image processing apparatus 100 determines whether to change the loss/delay mode of the image encoder 180 while receiving content data (1220).

As illustrated in operations 1080 and 1090 of FIG. 7, the image processing apparatus 100 may determine whether to change the loss/delay mode of the image encoder 180 by user input or metadata of content.

Upon determination of the change in the loss/delay mode of the image encoder 180 (Yes of 1220), the image processing apparatus 100 determines the loss/delay mode to be changed (1230).

As illustrated in operation 1100 of FIG. 7, the image processing apparatus 100 may change the loss/delay mode of the image encoder 180 to the low-loss/high-delay mode or the high-loss/low-delay mode based on the user input of metadata of content.

Specifically, the event generator 170 may generate a high-loss/low-delay event signal at the start of user input. The event generator 170 may generate a low-loss/high-delay event signal at the end of the user input. In addition, the event generator 170 may generate the high-loss/low-delay event signal based on metadata of content indicating the high-loss/low-delay mode. The event generator 170 may also generate the low-loss/high-delay event signal based on metadata of content indicating the low-loss/high-delay mode.

When the loss/delay mode is changed to the high-loss/low-delay mode ("high-loss/low-delay mode" of 1230), the image processing apparatus 100 changes the encoding option to a high-loss/low-delay encoding option (1240).

The image processing apparatus 100 may change the encoding option to the high-loss/low-delay encoding option to deactivate the image preprocessor 181, store the "previous image frame" and the "current image frame" in the first frame buffer 182, and control the inter frame predictor 185 to generate an inter frame based on the "previous image frame" and the "current image frame".

The image processing apparatus 100 performs encoding of the image frame in the high-loss/low-delay mode (1250).

The image encoder 180 of the image processing apparatus 100 may encode the image frame of content data according to the high-loss/low-delay encoding option. For example, the image encoder 180 may generate an intra frame and an inter frame in accordance with the high-loss/low-delay encoding option, quantize the intra frame and the intra frame, and perform entropy encoding on the quantized intra frame and inter frame.

As the image frame of content data is encoded according to the high-loss/low-delay encoding option, a time delay for encoding may decrease.

For example, as illustrated in FIG. 9, the content data may be encoded into an image data stream by the image processing apparatus 100. While the image encoder 180 encodes image frames with a time delay of approximately 5 frames in the low-loss/high-delay mode, the image encoder 180 may encode image frames with no time delay in the high-loss/low-delay mode.

In addition, the content data may include a plurality of image frames 2001 to 2034, and an encoded image data stream may also include a plurality of image frames 2101 to 2129.

The content data may be input to the image encoder 180 sequentially from a first image frame 2001 to a seventh image frame 2007. After a time delay of 5 frames, the image data stream may be output from the image encoder 180 sequentially from a first image frame 2101 to a second image frame 2102.

When an eighth image frame 2008 of the content data is input, a loss/delay mode change event may occur by user input and/or metadata of content. In other words, the loss/delay mode of the image encoder 180 may be changed from the low-loss/high-delay mode to the high-loss/low-delay mode.

When the loss/delay mode is changed to the high-loss/low-delay mode, the image encoder 180 may change the encoding option to reduce the encoding time delay. The change of the encoding option may be reflected from a ninth image frame 2009 of the content data which is a next frame of the eighth image frame 2008.

As a result, the encoding time delay of the image encoder 180 decreases after the ninth image frame 2009 of the content data, and the image encoder 180 may encode image frames in approximately real time.

After the loss/delay mode is changed to the high-loss/low-delay mode, the image processing apparatus 100 determines whether or not encoded image frames are duplicates (1260).

Due to the decrease in the encoding time delay, image frames encoded by the image encoder 180 may be duplicates.

For example, as illustrated in FIG. 9, if the loss/delay mode is changed to the high-loss/low-delay mode at the time of inputting the eighth image frame 2008 of the content data, a ninth image frame of the image data stream encoded in real time from a ninth image frame 2009 of the content data in the high-loss/low-delay mode and a fourth image frame of the image data stream encoded from a fourth image frame 2004 of the content data in the low-loss/high-delay mode may simultaneously be output.

Similarly, a tenth image frame of the image data stream encoded in real time from a tenth image frame 2010 of the content data in the high-loss/low-delay mode and a fifth image frame of the image data stream encoded from a fifth image frame 2005 of the content data in the low-loss/high-delay mode may simultaneously be output.

In other words, frame duplication may occur during 5 frames.

When frame duplication occurs (Yes of 1260), the image processing apparatus 100 drops some duplicate image frames (1270).

Specifically, the image processing apparatus 100 may not output some duplicate image frames.

For example, as illustrated in FIG. 9, the image encoder 180 may output a third image frame 2103 encoded in the low-loss/high-delay mode before the event. In addition, the image encoder 180 may generate ninth to thirteenth image frames encoded in the high-loss/low-delay mode and generate fourth to eighth image frames encoded in the low-loss/high-delay mode, simultaneously. Then, the image encoder 180 may output a fourteenth image frame 2114 encoded in the high-loss/low-delay mode.

The image encoder 180 may drop some image frames to naturally connect the frames from the third image frame 2103 to the fourteenth image frame 2114. In other words, the image encoder 180 may not output some of the encoded image frames.

As illustrated in FIG. 9, the image encoder 180 may output only a fourth image frame 2104, a sixth image frame 2106, an eighth image frame 2108, a tenth image frame 2110, and a twelfth image frame 2112 during 5 frames in which image duplication occurs. In other words, a fifth image frame, a seventh image frame, a ninth image frame, an eleventh image frame, and a thirteenth image frame may be dropped.

Next, the image processing apparatus 100 generates metadata (1280).

The image encoder 180 of the image processing apparatus 100 may generate metadata indicating the high-loss/low-delay encoding option.

Specifically, the meta generator 191 of the image encoder 180 may generate metadata indicating the high-loss/low-delay mode and add the metadata to the image data stream.

When the loss/delay mode is changed to the low-loss/high-delay mode ("low-loss/high-delay mode" of 1230), the image processing apparatus 100 changes the encoding option to the low-loss/high-delay encoding option (1290).

The image processing apparatus 100 may change the encoding option to activate the image preprocessor 181, store the "previous image frame", the "current image frame", and the "next image frame" in the first frame buffer 182, and control the inter frame predictor 185 to generate an inter frame based on the "previous image frame", the "current image frame", and the "next image frame".

The image processing apparatus 100 performs encoding of image frames in the low-loss/high-delay mode (1300).

The image encoder 180 of the image processing apparatus 100 may encode image frames of the content data according to the low-loss/high-delay encoding option. For example, the image encoder 180 may generate an intra frame and an inter frame in accordance with the low-loss/high-delay encoding option, quantize the intra frame and the intra frame, and perform entropy encoding on the quantized intra frame and inter frame.

As the image frames of the content data are encoded according to the low-loss/high-delay encoding option, a loss of image information may decrease but a time delay for encoding may increase.

For example, as illustrated in FIG. 9, when a seventeenth image frame 2017 of the content data is input, a loss/delay mode change event may occur by user input and/or metadata of content. In other words, the loss/delay mode of the image encoder 180 may be changed from the high-loss/low-delay mode to the low-loss/high-delay mode.

When the loss/delay mode is changed to the low-loss/high-delay mode, the image encoder 180 may change the encoding option to reduce the loss of image information. The change of the encoding option may be reflected from a twenty-third image frame 2018 after 5 frames from the seventeenth image frame 2017.

As a result of changing to the low-loss/high-delay mode, the encoding time delay of the image encoder 180 increases after an eighteenth of 2018 of the content data and the image encoder 180 may encode images with a time delay of 5 frames.

In addition, since the low-loss/high-delay encoding option is reflected after 5 frames, the image processing apparatus 100 may notify the display apparatus 200 of image frame missing caused by the increase in the encoding time delay.

After the mode is changed to the low-loss/high-delay mode, the image processing apparatus 100 determines whether or not image frames are missing from output image frames (1310).

As the encoding time delay increases, the image frame output from the image encoder 180 is delayed and image frames may be missing.

For example, as illustrated in FIG. 9, if the mode is changed to the low-loss/high-delay mode at the time of inputting the seventeenth image frame 2017 of the content data, the loss of image information may decrease and the encoding time delay may increase from the twenty-third image frame 2023 after 5 frames.

Eighteenth to twenty-second image frames 2018-2022 of the content data are encoded in real time in the high-loss/low-delay mode and eighteenth to twenty-second image frames 2118-2122 of the image data stream are output. Meanwhile, a twenty-third image frame 2023 of the content data is encoded with a time delay of 5 frames in the low-loss/high-delay mode, a twenty-second image frame 2122 of the image data stream is output, and a twenty-third image frame 2123 of the image data stream after 5 frames is output.

As described above, image frames may not be output during 5 frames from the twenty-second image frame 2122 to the twenty-third image frame 2123 of the image data stream. In other words, image frame missing may occur during about 5 frames.

Next, the image processing apparatus 100 generates metadata (1320)

The image encoder 180 of the image processing apparatus 100 may generate metadata indicating the low-loss/high-delay encoding option.

In addition, the image encoder 180 may generate metadata on image frame missing. For example, as illustrated in FIG. 9, each of the eighteenth to twenty-second image frames 2118 to 2122 of the image data stream may respectively include metadata indicating image frame missing. The display apparatus 200 may supplement the eighteenth to twenty-second image frame 2118-2122 based on the metadata indicating image frame missing.

Specifically, the meta generator 191 of the image encoder 180 may generate metadata indicating the low-loss/high-delay mode and metadata indicating the image frame missing and add the metadata to the image data stream.

When the loss/delay mode of the image encoder 180 is not changed (No of 1020), the image processing apparatus 100 performs encoding in the existing loss/delay mode (1330).

For example, as illustrated in FIG. 9, the image processing apparatus 100 may encode image frames in real time in the high-loss/low-delay mode and may encode image frame with the time delay of 5 frames in the low-loss/high-delay mode.

Next, the image processing apparatus 100 waits for next content data (1340).

As described above, when the loss/delay mode is changed to the high-loss/low-delay mode, the image processing apparatus 100 may encode image frames according to the high-loss/low-delay encoding option and drop some image frames to eliminate frame duplication caused by a decrease in the encoding time delay.

Also, when the loss/delay mode is changed to the low-loss/high-delay mode, the image processing apparatus 100 may encode image frames according to the low-loss/high-delay encoding option and add metadata indicating image frame missing to the image frames to supplement missing image frames caused by the increase in the encoding time delay.

Figure 10:
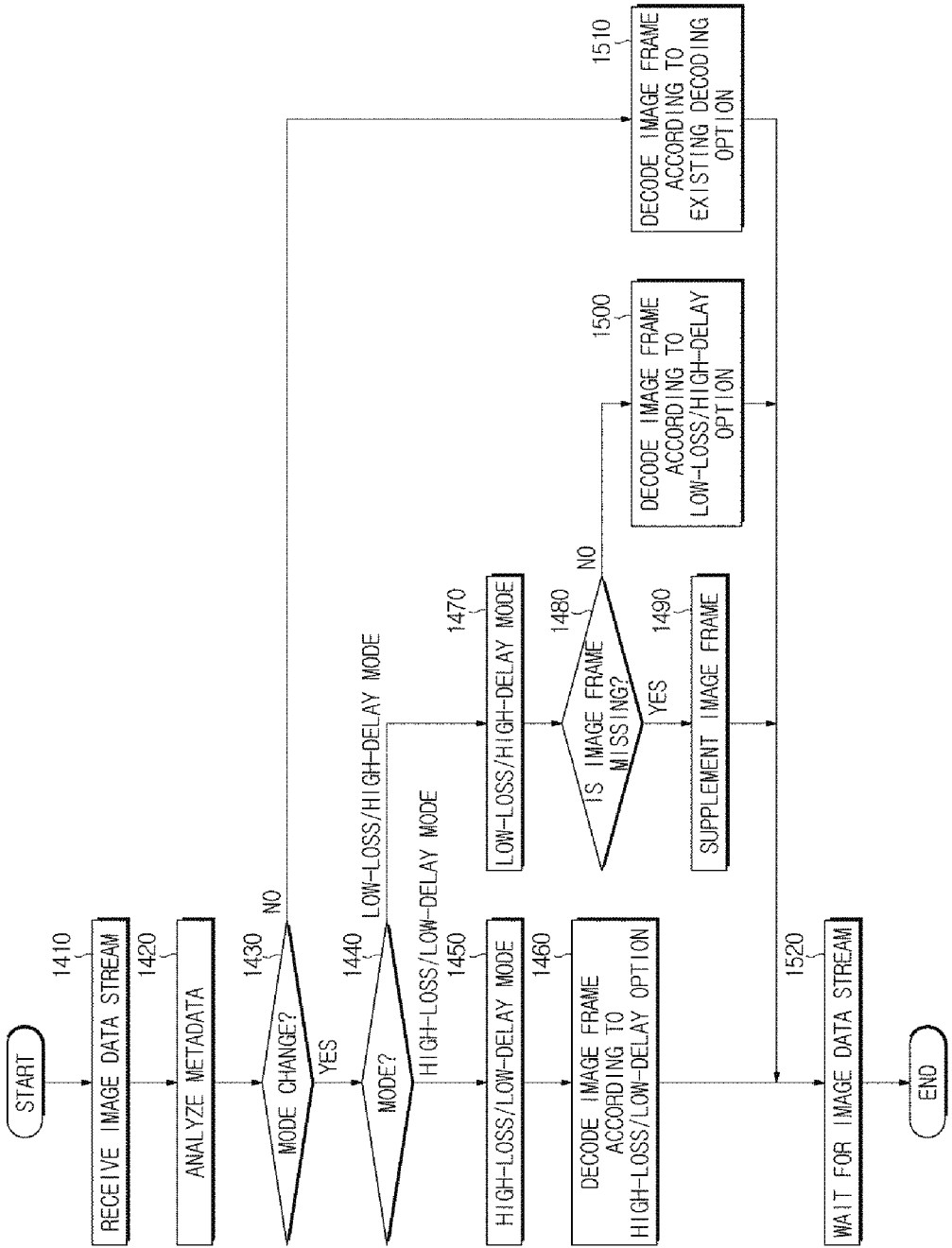
FIG. 10 is a flowchart illustrating a decoding operation of a display apparatus according to an embodiment.
Figure 11:
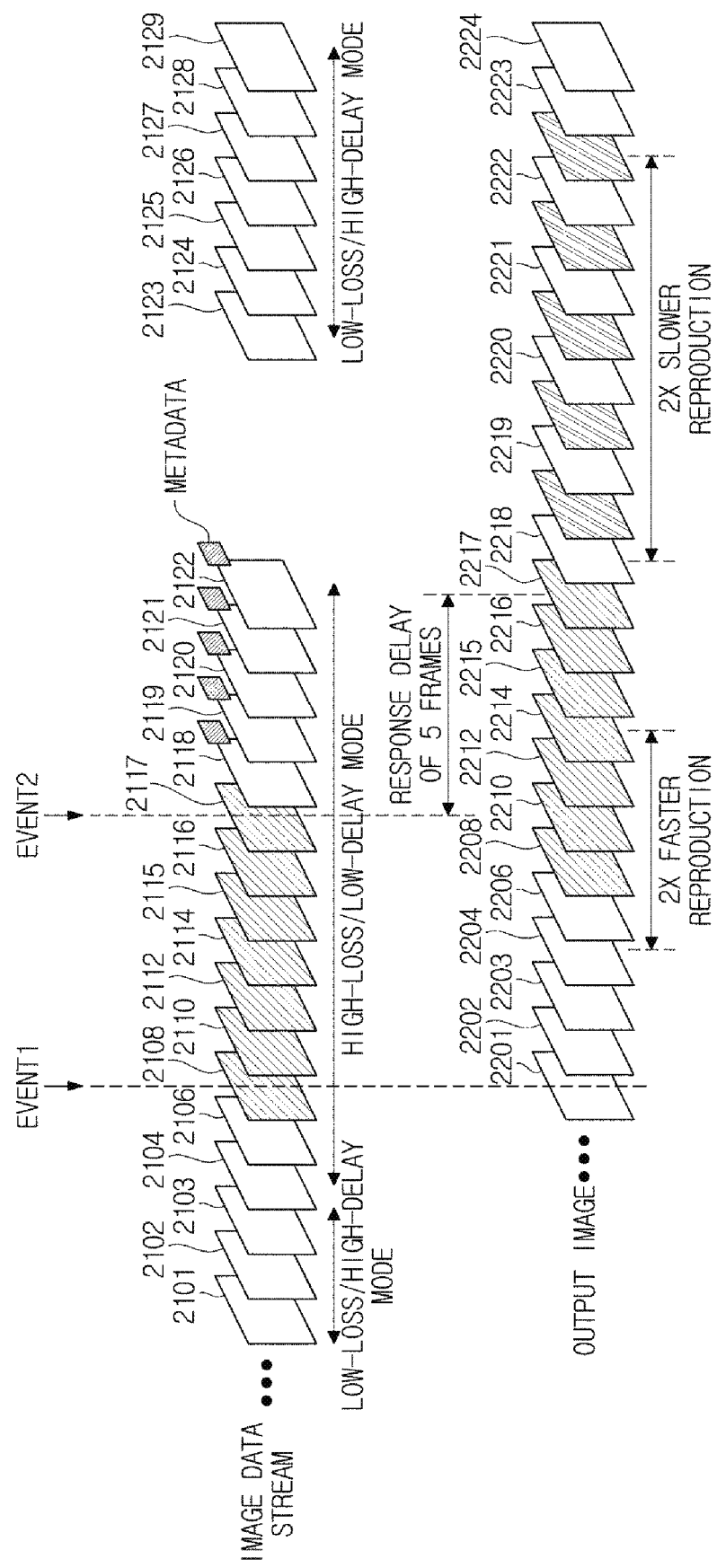
FIG. 11 is a view illustrating an example of decoding image frames according to a decoding operation such as the one illustrated with reference to FIG. 10.

FIG. 10 is a flowchart illustrating a decoding operation of a display apparatus according to an embodiment. FIG. 11 is a view illustrating an example of decoding image frames according to a decoding operation such as the one illustrated in FIG. 10.

Referring to FIGS. 10 and 11, a method of decoding image frames performed by the display apparatus 200 will be described. The display apparatus 200 may perform the following decoding operation (1400) at predetermined time intervals.

The display apparatus 200 receives an image data stream from the image processing apparatus 100 (1410).

The display apparatus 200 may receive the image data stream from the image processing apparatus 100 via the second communication interface 220.

The display apparatus 200 analyzes metadata while receiving the image data stream (1420).

The display apparatus 200 may extract metadata from the image data stream and analyze the extracted metadata.

For example, the meta analyzer 282 of the image decoder 280 may determine whether the encoding option is the low-loss/high-delay encoding option or the high-loss/low-delay encoding option based on the metadata of the image data stream.

Also, the meta analyzer 282 may determine whether or not image frames are missing based on the metadata of the image data stream. As described above, when the loss/delay mode is changed from the high-loss/low-delay mode to the low-loss/high-delay mode, some image frames included in the image data stream may be missing. When the loss/delay mode is changed from the high-loss/low-delay mode to the low-loss/high-delay mode, the meta generator 191 may add metadata on the image frame missing to data of the image stream such that the display apparatus 200 supplements the missing image frames. The meta analyzer 282 may identify image frame missing based on the metadata on the image frame missing.

The display apparatus 200 may identify a change in the loss/delay mode of the image encoder 180 (1430).

The display apparatus 200 may determine whether or not the loss/delay mode of the image encoder 180 is changed based on a change in an encoding option of the image encoder 180.

For example, the meta analyzer 282 of the image decoder 280 may store the encoding option of the image encoder 180 and compare an encoding option identified based on metadata and a pre-stored encoding option. If the encoding option identified based on the metadata is different from the pre-stored encoding option, the meta analyzer 282 may determine that the loss/delay mode of the image encoder 180 is changed.

Upon determination that the loss/delay mode of the image encoder 180 is changed (Yes of 1430), the display apparatus 200 identifies the changed loss/delay mode (1430).

The display apparatus 200 may identify the changed loss/delay mode of the image encoder 180 based on the change in the encoding option of the image encoder 180.

For example, when the encoding option is changed from the low-loss/high-delay encoding option to the high-loss/low-delay encoding option, the meta analyzer 282 of the image decoder 280 may determine that the loss/delay mode of the image encoder 180 is changed to the high-loss/low-delay mode. In addition, when the encoding option is changed from the high-loss/low-delay encoding option to the low-loss/high-delay encoding option, the meta analyzer 282 of the image decoder 280 may determine the loss/delay mode of the image encoder 180 is changed to the low-loss/high-delay mode.

Upon determination that the encoding option is changed to the high-loss/low-delay mode ("high-loss/low-delay mode" of 1440), the display apparatus 200 changes a decoding mode to a high-loss/low-delay mode (1450).

The display apparatus 200 may change the decoding option to a high-loss/low-delay decoding option.

Also, the display apparatus 200 decodes image frames of the image data stream according to the high-loss/low-delay decoding option (1460).

The image decoder 280 of the display apparatus 200 may store the high-loss/low-delay decoding option and decode image frames of the image data stream according to the high-loss/low-delay decoding option.

For example, the second motion compensator 285 of the image decoder 280 may perform motion compensation for the "previous image frame" stored in the second frame buffer 286 and decode the "current image frame" based thereon. In other words, the second motion compensator 285 may decode the "current image frame" by using forward motion compensation.

In addition, the second multiplexer 288 of the image decoder 280 may output the "current image frame" decoded by the second motion compensator 285.

Upon determination that the encoding option is changed to the low-loss/high-delay mode ("low-loss/high-delay mode" of 1440), the display apparatus 200 changes the decoding mode to a low-loss/high-delay mode (1470).

The display apparatus 200 may change the decoding option to the low-loss/high-delay decoding option.

In addition, the display apparatus 200 determines whether or not image frame missing occurs (1460).

The image decoder 280 of the display apparatus 200 may determine image frame missing based on metadata on image frame missing.

For example, as illustrated in FIG. 11, the eighteenth to twenty-second image frames 2118 to 2122 of the image data stream may include metadata on image frame missing. The meta analyzer 282 may determine that the eighteenth to twenty-second image frames 2118 to 2122 of the image data stream are missing. Also, the meta analyzer 282 may determine that other image frames not including metadata on the image frame missing are not missing.

If there is a missing image frame (Yes of 1460), the display apparatus 200 supplements the missing image frame (1490).

The image decoder 280 of the display apparatus 200 may supplement the missing image frame based on the "previous image frame" or supplement the missing image frame based on both the "previous image frame" and the "next image frame".

For example, upon determination that there is missing image frames, the meta analyzer 282 of the image decoder 280 may output a frame supplement signal to the image supplementer 287 and the second multiplexer 288. The image supplementer 287 of the image decoder 280 may output the "previous image frame" stored in the second frame buffer 286 in response to reception of the frame supplement signal. In other words, the display apparatus 200 may repeat the image frame.

As illustrated in FIG. 11, the image supplementer 287 may output the same image frame as the "previous image frame" after outputting an eighteenth output image frame 2218. In other words, the eighteenth output image frame 2218 may be output during 2 frames. Also, the image supplementer 287 may output the same image frame as the "previous image frame" after outputting a nineteenth output image frame 2219. In other words, the nineteenth output image frame 2219 may be output during 2 frames.

As another example, the image supplementer 287 of the image decoder 280 may receive the "previous image frame" and the "next image frame" stored in the second frame buffer 286 and may generate an interpolated image frame based on the "previous image frame" and the "next image frame" in response to reception of the frame supplement signal. The image supplementer 287 may calculate a motion vector between the "previous image frame" and the "next image frame" and perform motion compensation for the "previous image frame" by using a half of the calculated motion vector. Thus, the image supplementer 287 may generate the "interpolated image frame" that may replace the "current image frame" and output the "interpolated image frame".

As illustrated in FIG. 11, the image supplementer 287 may generate an "interpolated image frame" based on the eighteenth output image frame 2218 and the nineteenth output image frame 2219 and output a generated "first interpolated image frame". Also, the image supplementer 287 may generate an "interpolated image frame" based on the nineteenth output image frame 2219 and a twentieth output image frame 2220 and output a generated "second interpolated image frame".

In addition, the second multiplexer 288 of the image decoder 280 may output a "current image frame" supplemented by the image supplementer 287 in response to the frame supplement signal.

If there is no missing image frame (No of 1460), the display apparatus 200 decodes image frames of the image data stream according to the low-loss/high-delay decoding option (1500).

The image decoder 280 of the display apparatus 200 may store the low-loss/high-delay decoding option and decode image frames of the image data stream according to the low-loss/high-delay decoding option.

For example, the second motion compensator 285 of the image decoder 280 may perform forward motion compensation on the "previous image frame" stored in the second frame buffer 286 and reverse compensation on the "next image frame", thereby decoding the "current image frame". In other words, the second motion compensator 285 may decode the "current image frame" by using both forward motion compensation and reverse motion compensation.

In addition, the second multiplexer 288 of the image decoder 280 may output the "current image frame" decoded by the second motion compensator 285.

When there is no change in the loss/delay mode of the image encoder 180 (No of 1430), the display apparatus 200 decodes image frames according to the existing decoding option (1510).

The image decoder 280 of the display apparatus 200 may decode image frames according to the existing decoding option.

Next, the display apparatus 200 waits for a next image data stream (1520).

As described above, the display apparatus 200 may identify the change in the loss/delay mode of the image encoder 180 and decode image frames according to a decoding option corresponding to the loss/delay mode of the image encoder 180.

Also, when the loss/delay mode of the image encoder 180 is changed from the high-loss/low-delay mode to the low-loss/high-delay mode, the display apparatus 200 may supplement missing image frames. Specifically, the display apparatus 200 may repeatedly output an image frame or output an interpolated image frame.

Figure 12:
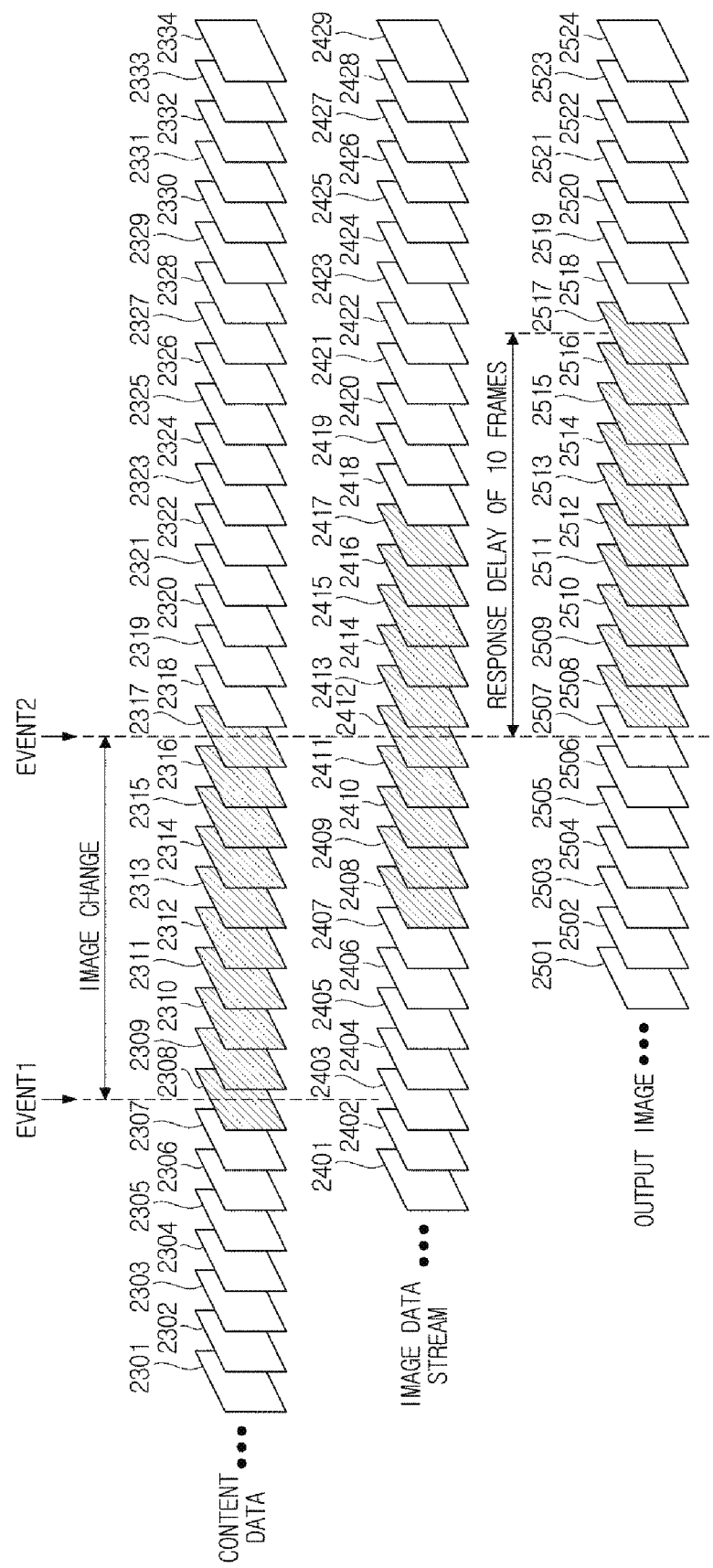
FIG. 12 is a view illustrating an example of encoding and decoding image frames according to a related art image processing apparatus.
Figure 13:
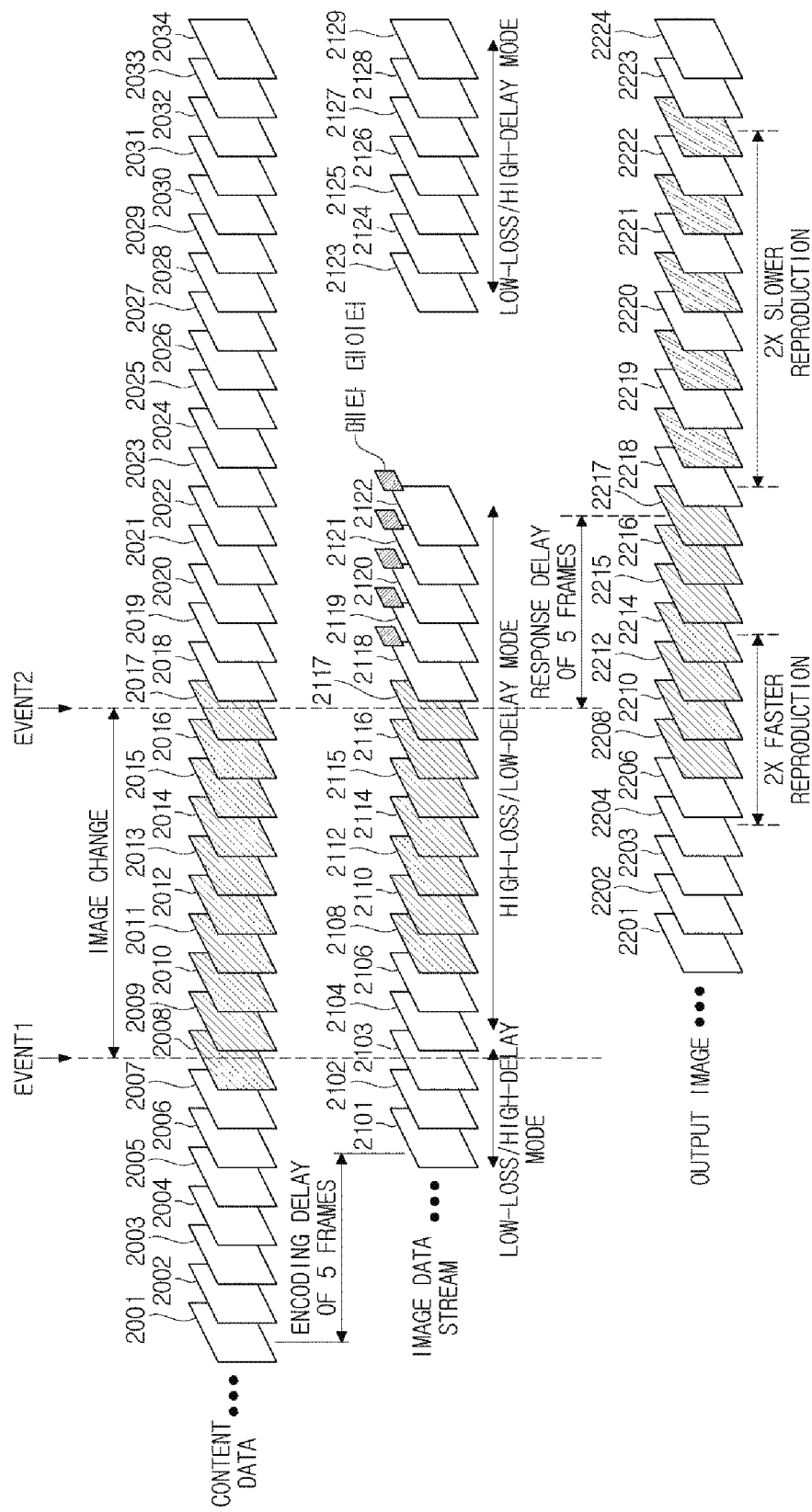
FIG. 13 is a view illustrating an example of encoding and decoding image frames of an image display system according to an embodiment.

FIG. 12 is a view illustrating an example of encoding and decoding of image frames according to a related art image processing apparatus. FIG. 13 is a view illustrating an example of encoding and decoding of image frames of an image display system according to an embodiment.

In the case where the loss/delay mode is changed while displaying an image, in comparison with the case where the loss/delay mode is not changed, the image display system 1 may quickly response to user input.

For example, if approximately 5 frames are required for image encoding and 5 frames are required for image decoding, the user may view an image of content at approximately 10 frames after receiving content data from the content sources 2 to 7.

As illustrated in FIG. 12, if the loss/delay mode is not changed while an image frame is encoded and decoded, an image to which user input is reflected may be displayed at approximately 10 frames after receiving the user input.

Specifically, the conventional image processing apparatus may sequentially encode image frames 2301 to 2334 input from the content source 2 to 7 and generate image stream data including encoded image frames 2401 to 2429.

When an eighth image frame 2308 of content data is input, user input may be received. However, the conventional image processing apparatus may encode eighth to seventeenth image frames 2308 to 2317 according to the existing encoding option with no change in the loss/delay mode and generate an image data stream including encoded eighth to seventeenth image frames 2408 to 2417 after approximately 5 frames. In this case, a time delay of 5 frames may occur between an input of a seventeenth image frame 2317 of the content data and an output of an encoded seventeenth image frame 2417.

The related art display apparatus may receive the image data stream including the encoded eighth to seventeenth image frames 2408 to 2417 and output decoded eighth to seventeenth image frames 2508 to 2517 after approximately 5 frames. In this regard, a time delay of 5 frames may occur between an input of a seventeenth image frame 2417 of the image data stream and an output of a decoded seventeenth image frame 2517.

Thus, the related art display apparatus may display an image to which user input is reflected at approximately 10 frames after receiving the user input.

On the contrary, the image display system 1 according to an embodiment may minimize the time delay from the user input to the output of an image to which the user input is reflected.

As illustrated in FIG. 13, the image processing apparatus 100 may sequentially encode image frames 2001 to 2034 input from the content source 2 to 7 and generate image stream data including encoded image frames 2101 to 2129.

When an eighth image frame 2308 of content data is input, a loss/delay mode change event may occur by user input and/or metadata of content. By the loss/delay mode change event, the image processing apparatus 100 may change the loss/delay mode to the high-loss/low-delay mode. The image processing apparatus 100 may encode eighth to seventeenth image frames 2008 to 2017 according to the high-loss/low-delay encoding option. Also, the image processing apparatus 100 may generate an image data stream including encoded eighth to seventeenth image frames 2108 to 2117. In this case, a time delay does not occur between an input of the seventeenth image frame 2017 of the content data and an output of the encoded seventeenth image frame 2117. In other words, the seventeenth image frame 2117 may be encoded and output in real time.

The display apparatus 200 may receive an image data stream including the encoded eighth to seventeenth image frames 2108 to 2117 and output decoded eighth to seventeenth image frames 2208 to 2217 after approximately 5 frames. In this case, a time delay of 5 frames may occur between the input of the seventeenth image frame 2117 of the image data stream and the output of the decoded seventh image frame 2217.

Thus, the display apparatus 200 may display an image to which user input is reflected at approximately 5 frames after receiving the user input.

As described above, the image display system 1 according to the embodiment may output an image having a minimized loss of image information in a section where user input is not received and may quickly output an image to which the user input is reflected upon receiving the user input.

However, since the image processing apparatus 100 drops some image frames at the start of user input as illustrated in FIG. 13, an image reproducing rate may increase. In addition, the image reproducing rate may decrease since the image frame is repeated or interpolated at the end of the user input.

However, since the image reproducing rate is instantly changed, it is difficult for the user to recognize the change.

Figure 14:
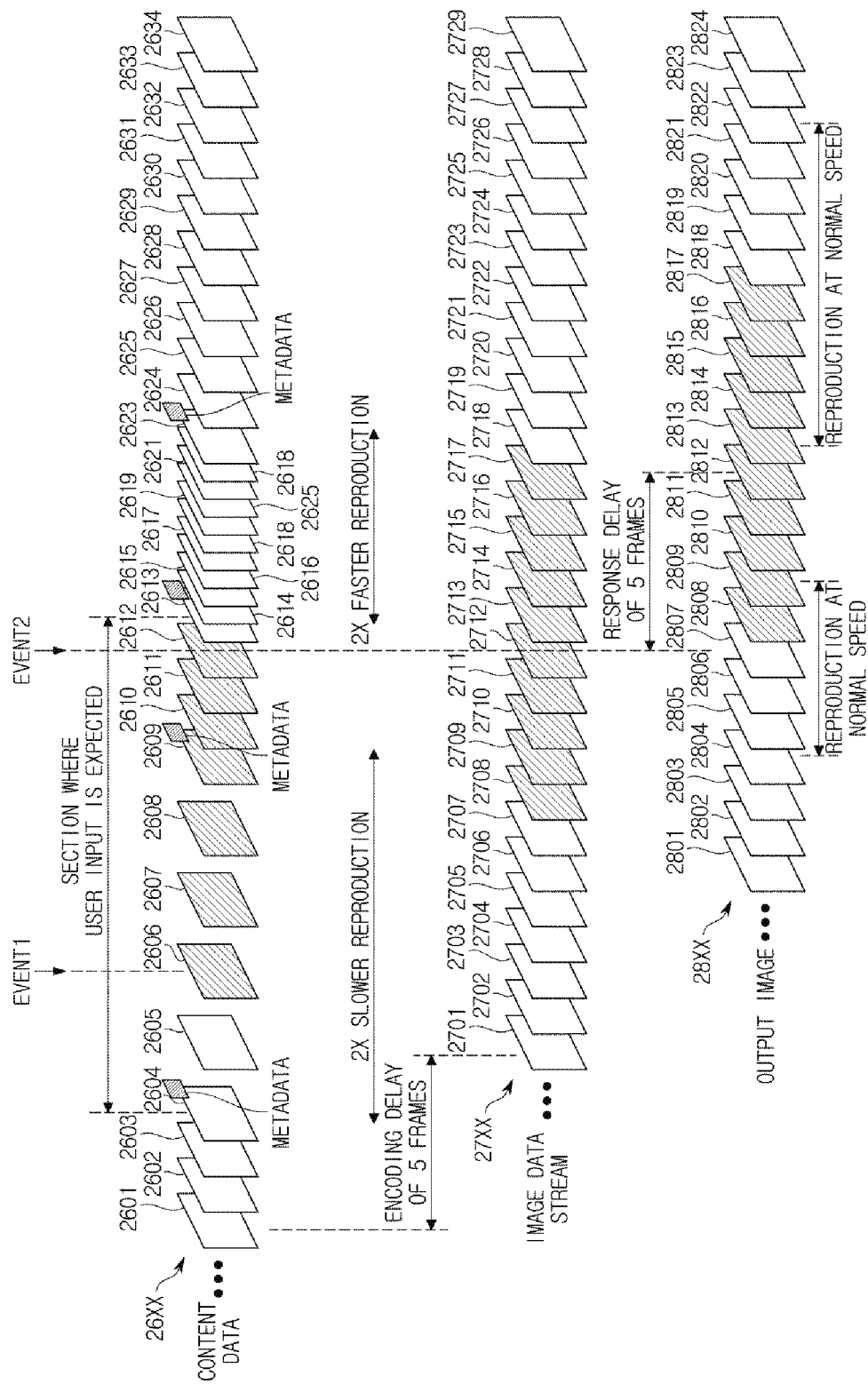
FIG. 14 is a view illustrating another example of encoding and decoding of image frames of the image display system according to an embodiment.

FIG. 14 is a view illustrating another example of encoding and decoding of image frames of the image display system according to an embodiment.

The content sources 2 to 7 may transmit content data having a changed frame rate in a section where reception of user input is expected or the user input is received. For example, the content sources 2 to 7 may lower a frame rate of image frames included in content data in a section where the start of user input is expected and raise the frame rate of image frames included in the content data in a section the end of the user input is expected.

Specifically, the content sources 2 to 7 may add metadata including information on the frame rate to the image frames at the section where the start of the user input is expected and lower the frame rate of the image frames.

As illustrated in FIG. 14, the content sources 2 to 7 may output content data including image frames 2601 to 2634. When the start of the user input is expected at a fourth image frame 2604, the content sources 2 to 7 may add metadata including information on the frame rate to the fourth image frame 2604.

Then, while approximately 5 frames 2605 to 2609 are transmitted, the content sources 2 to 7 may reduce the frame rate in half. In other words, the content sources 2 to 7 may transmit the fourth image frame 2604 and transmit a fifth image frame 2605 after not transmitting 1 image frame. As a result, the image processing apparatus 100 receives content data including 5 image frames 2605 to 2609 during 10 frames in which the user input is expected to start, and the image reproducing rate may be slowed down twice.

Then, at 10 frames after the frame rate is reduced, the content sources 2 to 7 may add metadata including information on the frame rate to the image frame and restore the frame rate of the image frame to an original level before reducing the frame rate. As illustrated in FIG. 14, the content sources 2 to 7 may add metadata including information on the frame rate to a tenth frame 2610 and restore the frame rate thereof to the original level before reducing the frame rate.

In addition, the content sources 2 to 7 may add metadata including information on the frame rate to the image frame at a section where the user input is expected to end and raise the frame rate of the image frame.

When the user input is expected to end at a thirteenth image frame 2613, the content sources 2 to 7 may add metadata including information on the frame rate to the thirteenth image frame 2613.

Then, the content sources 2 to 7 may increase the frame rate twice while approximately 20 image frames 2613 to 2622 are transmitted. In other words, the content sources 2 to 7 may transmit the thirteenth image frame 2613 and then transmit a fourteenth image frame 2614 after ½ frame elapsed. Then after ½ frame, the content sources 2 to 7 may transmit a fifteenth image frame 2615. As a result, the image processing apparatus 100 may receive content data including 20 image frames 2613 to 2622 during 10 frames in which the start of user input is expected and the image reproducing rate may be doubled.

At 10 frames after the frame rate is reduced, the content sources 2 to 7 add metadata including information on the frame rate to the image frame and restore the frame rate of the image frame to the original level before increasing the frame rate. As illustrated in FIG. 14, the content sources 2 to 7 may add metadata including information on the frame rate to a twenty-fourth frame 2624 and restore the frame rate of subsequent image frames to the original level before increasing the frame rate.

The image processing apparatus 100 may receive content data including image frames whose frame rates have been changed and encode image frames included in the content data. The image processing apparatus 100 may also generate an image data stream including encoded image frames 2701 to 2729. For example, the image processing apparatus 100 may receive image frames 2601 to 2634 included in content data and generate an image data stream including encoded image frames 2701 to 2729.

In addition, the image processing apparatus 100 may receive user input directly or via the display apparatus 200 while encoding the image frames 2601 to 2634 of the content data. For example, when a sixth image frame 2606 of the content data is input to the image processing apparatus 100, the user input may be started. Then, the loss/delay mode of the image processing apparatus 100 is changed to the high-loss/low-delay mode and the image processing apparatus 100 may encode image frames according to the high-loss/low-delay encoding option.

After user input is started, the image processing apparatus 100 may generate an image data stream including encoded image frames 2706 to 2712. Since the frame rate of the image frames 2606 to 2612 included in the content data has been decreased, duplication does not occur in the encoded image frames 2706 to 2712. As a result, the image processing apparatus 100 does not drop the encoded image frames 2706 to 2712.

The image processing apparatus 100 may transmit the image data stream including the encoded image frames 2706 to 2712 to the display apparatus 200 and the display apparatus 200 may decode the image frames 2706 to 2712 included in the image data stream. In addition, the display apparatus 200 may display decoded image frames 2806 to 2812.

In this case, a reproducing rate of the image frames 2706 to 2712 displayed in the display apparatus 200 is not changed. As described above since the image processing apparatus 100 does not drop image frames, there is no change in the reproducing rate of the image frames 2806 to 2812 displayed in the display apparatus 200.

The user input may be terminated when a twelfth image frame 2612 of content data is input to the image processing apparatus 100. Then, the loss/delay mode of the image processing apparatus 100 is changed to the low-loss/high-delay mode, and the image processing apparatus 100 may encode image frames according to the high-loss/low-delay encoding option.

After the user input is terminated, the image processing apparatus 100 may generate an image data stream including encoded image frames 2713 to 2722. Since the frame rate of the image frames 2613 to 2622 included in the content data has been increased, the encoded image frames 2613 to 2622 are not missing. In other words, there is no image frame missing between the image frames 2613 to 2622 encoded according to the high-loss/low-delay encoding option and the image frame 2623 encoded according to low-loss/high-delay encoding option.

The image processing apparatus 100 may transmit the image data stream including the encoded image frames 2706 to 2712 to the display apparatus 200 and the display apparatus 200 may decode the image frames 2706 to 2712 included in the image data stream. Also, the display apparatus 200 may display the decoded image frames 2806 to 2812.

In this case, since none of the encoded image frames 2613 to 2622 is missing, the display apparatus 200 does not perform repetition or interpolation of images which is performed to supplement missing image frames. Thus, there is no change in the reproducing rate of the image frames 2813 to 2822 displayed on the display apparatus 200.

As described above, the content sources 2 to 7 may change the frame rate in the section where reception of the user input is expected or the user input is received. In other words, the content sources 2 to 7 may output content data including image frames whose frame rates are changed, and the image processing apparatus 100 may encode image frames whose frame rates are changed. Due to the change in the frame rate, duplication of image frames encoded by the image processing apparatus 100 does not occur even when the loss/delay mode is changed to the high-loss/low-delay mode and the image processing apparatus 100 may not drop image frames. In addition, even when the loss/delay mode is changed to the low-loss/high-delay mode, image frames are not missing in the image processing apparatus 100 and the display apparatus 200 does not perform repetition or interpolation of image frames. Thus, the display apparatus 200 may display at a constant reproducing rate.

As is apparent from the above description, an image display system according to the present disclosure includes an image processing apparatus configured to generate an image data stream from content and a display apparatus configured to display an image in response to the image data stream of the image processing apparatus.

According to the present disclosure, the image processing apparatus and the display apparatus of the image display system are connected to each other in a wireless manner.

According to the present disclosure, the image display system may control image display time delay according to user input and/or content source and/or content.

Although a few embodiments of the present disclosure have been shown and described, it would be appreciated by those skilled in the art that changes may be made in these embodiments without departing from the principles and spirit of the disclosure, the scope of which is defined in the claims and their equivalents.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An image processing apparatus comprising:
a content interface;
a communication interface; and
a controller configured to receive content comprising a plurality of image frames from a content source through the content interface, encode the plurality image frames according to an encoding option selected from among a plurality of encoding options, and transmit the encoded image frames to a display apparatus through the communication interface,
wherein the controller is further configured to:
encode the plurality of image frames according to a first encoding option, and
encode the plurality of image frames according to a second encoding option having a different encoding time delay from the first encoding option, and
wherein the controller is configured to change the encoding option depending on whether the content is changed or whether the content source is changed.

2. The image processing apparatus of claim 1, wherein the controller is further configured to encode the plurality of image frames according to the first encoding option having a first encoding time delay and a first loss rate of image information, and
the controller is further configured to encode the plurality of image frames according to the second encoding option having a second encoding time delay greater than the first encoding time delay and a second loss rate of image information smaller than the first loss rate of image information.

3. The image processing apparatus of claim 2, wherein the controller is further configured to:
output a first event signal in response to at least one of the content comprising metadata indicating the first encoding option or in response to receiving an initiation of user input, and output a second event signal in response to the at least one of the content comprising metadata indicating the second encoding option or in response to receiving a termination of the user input, and wherein the controller comprises an image encoder configured to encode the plurality of image frames according to the first encoding option or the second encoding option depending on whether the first event signal or the second event signal is output.

4. The image processing apparatus of claim 3, wherein, in response to receiving the first event signal, the image encoder changes the encoding option to the first encoding option and encodes the image frames with the first encoding time delay and the first loss rate of image information.

5. The image processing apparatus of claim 4, wherein, when the controller determines that the encoded image frames are duplicates while the image frames are encoded according to the first encoding option, the image encoder prevents the determined duplicated image frames from being output.

6. The image processing apparatus of claim 3, wherein, in response to receiving the second event signal, the image encoder changes the encoding option to the second encoding option and encodes the image frames with the second encoding time delay and the second loss rate of image information.

7. The image processing apparatus of claim 6, wherein, when the encoded image frames are missing while the image frames are encoded according to the second encoding option, the image encoder adds metadata to the encoded image frames allowing the display apparatus to supplement the missing image frames.

8. The image processing apparatus of claim 3, wherein:
in response to the content source, which provides the content through the content interface, being changed, the controller is further configured to output one of the first event signal and the second event signal according to the changed content source, and
in response to a change in content being received by the controller, the controller is further configured to output one of the first event signal and the second event signal according to the changed content.

9. The image processing apparatus of claim 1, wherein the controller transmits, through the communication interface, the encoded image frames to the display apparatus in a wireless manner.

10. A method of processing an image, the method comprising:
receiving content comprising a plurality of image frames from a content source;
encoding the plurality of image frames according to an encoding option;
generating different event signals according to at least one of metadata comprised in the received content and a reception of user input; and
transmitting the encoded image frames to a display apparatus,
wherein the encoding of the image frames comprises encoding the image frames according to different encoding options having different encoding time delays in response to the different event signals, and
wherein the encoding option is changed depending on whether the content is changed or the content source is changed.

11. The method of claim 10, wherein the encoding of the plurality of image frames having the different encoding time delays comprises:

encoding the plurality of image frames according to a first encoding option having a first encoding time delay and a first loss rate of image information in response to a first event signal from among the different event signals; and
encoding the plurality of image frames according to a second encoding option having a second encoding time delay greater than the first encoding time delay and a second loss rate of image information smaller than the first loss rate of image information in response to a second event signal from among the different event signals.

12. The method of claim 11, wherein the generating of the different event signals comprises generating the first event signal in response to at least one of:
a change in the content source;
a change in the content;
a receipt of user input; and
the content comprising metadata indicating the first encoding option.

13. The method of claim 12, wherein the encoding further comprises:
changing the encoding option to the first encoding option in response to the first event signal; and
when the encoded image frames are duplicate while encoding the plurality of image frames in the first encoding option, preventing the duplicate images frames from being output.

14. The method of claim 11, wherein the generating of the event signal comprises outputting the second event signal in response to at least one of:
a change in the content source;
a change in the content;
a termination of user input; and
the content comprising metadata indicating the second encoding option.

15. The method of claim 14, wherein the encoding further comprises:
changing the encoding option to the second encoding option in response to the second event signal; and
when the encoded image frames are missing while encoding the image frames in the second encoding option, adding metadata to the encoded image frames allowing the display apparatus to supplement the missing image frames.

16. An image display system comprising:
an image processing apparatus configured to encode image content to an image data stream; and
a display apparatus configured to display image frames converted from the image data stream,
wherein the image processing apparatus comprises:
a transmitter; and
a controller configured to:
encode the image content in an encoding mode selected from among a plurality of encoding modes having varying encoding time delays,
change the encoding mode in response to at least one of a change in the image content, a change in a source of the image content, user input, and metadata of the image content, and
transmit the image data stream to the display apparatus through the transmitter.

17. The image display system of claim 16, wherein the controller encodes the image content with a first encoding time delay and a first loss rate of image information in a first encoding mode and encodes the image content with a second encoding time delay greater than the first encoding time delay and a second loss rate of image information smaller than the first loss rate of image information in a second encoding mode.

18. The image display system of claim 17, wherein, in response to receiving the user input while encoding the image content in the second encoding mode, the controller changes the encoding mode from the second encoding mode to the first encoding mode.

19. The image display system of claim 17, wherein, in response to the user input being terminated while encoding the image content in the first encoding mode, the controller changes the encoding mode from the first encoding mode to the second encoding mode.

20. The image display system of claim 16, wherein the display apparatus receives the image data stream, converts the image data stream into image frames, and displays the image frames.

* * * * *